US011223852B2

(12) United States Patent
Li et al.

(10) Patent No.: US 11,223,852 B2
(45) Date of Patent: Jan. 11, 2022

(54) CODING VIDEO DATA USING A TWO-LEVEL MULTI-TYPE-TREE FRAMEWORK

(71) Applicant: QUALCOMM Incorporated, San Diego, CA (US)

(72) Inventors: Xiang Li, San Diego, CA (US); Jianle Chen, San Diego, CA (US); Li Zhang, San Diego, CA (US); Xin Zhao, San Diego, CA (US); Hsiao-Chiang Chuang, San Diego, CA (US); Feng Zou, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/463,398

(22) Filed: Mar. 20, 2017

(65) Prior Publication Data
US 2017/0272782 A1    Sep. 21, 2017

Related U.S. Application Data

(60) Provisional application No. 62/311,248, filed on Mar. 21, 2016, provisional application No. 62/401,016, filed on Sep. 28, 2016.

(51) Int. Cl.
H04N 19/96        (2014.01)
H04N 19/103       (2014.01)
(Continued)

(52) U.S. Cl.
CPC .......... *H04N 19/96* (2014.11); *H04N 19/103* (2014.11); *H04N 19/119* (2014.11);
(Continued)

(58) Field of Classification Search
CPC .... H04N 19/96; H04N 19/159; H04N 19/119; H04N 19/172; H04N 19/174; H04N 19/176
See application file for complete search history.

(56) References Cited

U.S. PATENT DOCUMENTS 9,462,275 B2    10/2016 Guo et al.
9,843,804 B2 *  12/2017 An .................... H04N 19/119
(Continued)

FOREIGN PATENT DOCUMENTS

CN    104081777 A    10/2014
CN    105103548 A    11/2015
(Continued)

OTHER PUBLICATIONS

MIT 6.02 DRAFT Lecture Notes Feb. 13, 2012 Chapter 3 Compression Algorithms: Huffman and Lempel-Ziv-Welch (LZW) pp. 25 (found http://web.mit.edu/6.02/www/s2012/handouts/3.pdf) (Year: 2012).*
(Continued)

*Primary Examiner* — Jayanti K Patel
*Assistant Examiner* — Christopher Kingsbury Glover
(74) *Attorney, Agent, or Firm* — Shumaker & Sieffert, P.A.

(57) ABSTRACT

An example device for decoding video data includes a video decoder configured to decode one or more syntax elements at a region-tree level of a region-tree of a tree data structure for a coding tree block (CTB) of video data, the region-tree having one or more region-tree nodes including region-tree leaf and non-leaf nodes, each of the region-tree non-leaf nodes having at least four child region-tree nodes, decode one or more syntax elements at a prediction-tree level for each of the region-tree leaf nodes of one or more prediction trees of the tree data structure for the CTB, the prediction
(Continued)

trees each having one or more prediction-tree leaf and non-leaf nodes, each of the prediction-tree non-leaf nodes having at least two child prediction-tree nodes, each of the prediction leaf nodes defining respective coding units (CUs), and decode video data for each of the CUs.

30 Claims, 14 Drawing Sheets

(51) Int. Cl.
  *H04N 19/46* (2014.01)
  *H04N 19/176* (2014.01)
  *H04N 19/119* (2014.01)
  *H04N 19/30* (2014.01)
  *H04N 19/50* (2014.01)
  *H04N 19/91* (2014.01)
  *H04N 19/51* (2014.01)
  *H04N 19/593* (2014.01)
  *H04N 19/61* (2014.01)
  *H04N 19/583* (2014.01)
  *H04N 19/159* (2014.01)
  *H04N 19/44* (2014.01)
  *H04N 19/124* (2014.01)

(52) U.S. Cl.
  CPC ........... *H04N 19/176* (2014.11); *H04N 19/30* (2014.11); *H04N 19/46* (2014.11); *H04N 19/50* (2014.11); *H04N 19/583* (2014.11); *H04N 19/124* (2014.11); *H04N 19/159* (2014.11); *H04N 19/45* (2014.11); *H04N 19/51* (2014.11); *H04N 19/593* (2014.11); *H04N 19/61* (2014.11); *H04N 19/91* (2014.11)

(56) References Cited

U.S. PATENT DOCUMENTS

| | | | |
|---|---|---|---|
| 10,687,079 B2 | 6/2020 | Liu et al. | |
| 2010/0208827 A1 | 8/2010 | Divorra et al. | |
| 2011/0042127 A1 | 2/2011 | Ohtsuka et al. | |
| 2011/0170610 A1 | 7/2011 | Min et al. | |
| 2012/0170648 A1* | 7/2012 | Chen | H04N 19/174 375/240.03 |
| 2012/0177120 A1 | 7/2012 | Guo et al. | |
| 2012/0189056 A1* | 7/2012 | Li | H04N 19/463 375/240.15 |
| 2012/0213278 A1 | 8/2012 | Yasugi et al. | |
| 2012/0328012 A1* | 12/2012 | Sasai | H04N 19/159 375/240.12 |
| 2013/0128974 A1 | 5/2013 | Chien et al. | |
| 2013/0188717 A1 | 7/2013 | Chen et al. | |
| 2014/0192876 A1 | 7/2014 | Yie et al. | |
| 2016/0081020 A1 | 3/2016 | Rahman et al. | |
| 2016/0100190 A1 | 4/2016 | Zhang et al. | |
| 2016/0277739 A1 | 9/2016 | Puri et al. | |
| 2017/0150176 A1 | 5/2017 | Zhang et al. | |
| 2017/0150183 A1 | 5/2017 | Zhang et al. | |
| 2017/0155903 A1* | 6/2017 | Rosewarne | H04N 19/159 |
| 2017/0208336 A1* | 7/2017 | Li | H04N 19/105 |
| 2018/0098097 A1* | 4/2018 | Huang | H04N 19/70 |
| 2018/0213264 A1* | 7/2018 | Zhang | H04N 19/96 |
| 2018/0332288 A1* | 11/2018 | Hsiang | H04N 19/159 |

FOREIGN PATENT DOCUMENTS

| | | | |
|---|---|---|---|
| CN | 106105216 A | 11/2016 | |
| CO | 6331398 A2 | 10/2011 | |
| EP | 2547107 A2 | 1/2013 | |
| EP | 2804383 A1 | 11/2014 | |
| JP | 2010524383 A | 7/2010 | |
| JP | 2013502144 A | 1/2013 | |
| RU | 2547707 C2 | 4/2015 | |
| WO | 2011049119 A1 | 4/2011 | |
| WO | 2011087297 A2 | 7/2011 | |
| WO | WO-2011087297 A2 * | 7/2011 | ........... H04N 19/139 |
| WO | 2011128269 A1 | 10/2011 | |
| WO | 2013116081 A2 | 8/2013 | |
| WO | 2014120369 A1 | 8/2014 | |
| WO | 2015190839 A1 | 12/2015 | |
| WO | 2016083729 A2 | 6/2016 | |
| WO | 2016090568 A1 | 6/2016 | |
| WO | 2016091161 A1 | 6/2016 | |
| WO | 2016155641 A1 | 10/2016 | |

OTHER PUBLICATIONS

Davies T., et al., "Suggestion for a Test Model", 1. JCT-VC Meeting, Apr. 15, 2010-Apr. 23, 2010, Dresden, (JointCollaborative Team on Video Coding of ISO/IEC JTCI/SC29/WGII and ITU-TSG.16),XP030007526, pp. 1-30, May 7, 2010 (May 7, 2010).

International Search Report and Written Opinion—PCT/US2017/023351—ISA/EPO—May 15, 2017—20 pp.

Karczewicz M., et al., "Study of Coding Efficiency Improvements beyond HEVC," 113. MPEG Meeting; Oct. 19, 2015-Oct. 23, 2015; Geneva; (Motion Picture Expert Group or ISO/IEC JTC1/SC29/WG11),, No. M37102, Oct. 15, 2015 (Oct. 15, 2015), XP030065470, whole document, 13 pp.

Minezawa A., et al., "Proposed Fix on CBF Flag Signaling", 98, MPEG Meeting, Nov. 28, 2011-Dec. 2, 2011, Geneva, (Motion Picture Expert Group OR ISO/IEC JTC1/SC29/WG11), No. m22008, Nov. 28, 2011 (Nov. 28, 2011), JCTVC-G444-r1, pp. 1-5, XP030050571.

Song B.C., et al., "A New Proposal on Motion Estimation with the OBMC on/off Mode for the Advanced Mode," 39. MPEG Meeting; Apr. 7, 1997-Apr. 11, 1997; Bristol; (Motion Pictureexpert Group or ISO/IEC JTC1/SC29/WG11 ),, No. M2057, Mar. 30, 1997 (Mar. 30, 1997), XP030031345, ISSN: 0000-0323, 10 pages.

ITU-T H.265, "Series H: Audiovisual and Multimedia Systems, Infrastructure of audiovisual services—Coding of moving video, High efficiency video coding," The International Telecommunication Union. Dec. 2016, 664 pp.

ITU-T H.264, Series H: Audiovisual and Multimedia Systems, Infrastructure of audiovisual services—Coding of moving video. Advanced video coding for generic audiovisual services, The International Telecommunication Union. Jun. 2011, 674 pp.

ITU-T H.263, "Series H: Audiovisual and Multimedia Systems, Infrastructure of audiovisual services—Coding of moving video, Video coding for low bit rate communication," The International Telecommunication Union. Jan. 2005, 226 pp.

ITU-T H.262, "Transmission of Non-Telephone Signals, Information Technology—Generic Coding of Moving Pictures and Associated Audio Information: Video," The International Telecommunication Union. Jul. 1995, 211 pp.

ITU-T H.261, "Line Transmission of Non-Telephone Signals, Video Codec for Audiovisual Services at px64 kbit/s," International Telecommunication Union, Mar. 1993, 29 pp.

Han, et al., "Improved Video Compression Efficiency Through Flexible Unit Representation and Corresponding Extension of Coding Tools", IEEE Transaction on Circuits and Systems for Video Technology, vol. 20, No. 12, Dec. 2010, 12 pp.

International Telecommunication Union, "Video Coding for Low Bitrate Communication," Draft H.263, ITU-T Telecommunication Standardization Sector of ITU, May 2, 1996, 54 pp.

Chen, et al., "Algorithm description of Joint Exploration Test Model 2", Joint Video Exploration Team, JVET-B1001, Feb. 20-26, 2016, 32 pp.

Fraunhofer HHI, "Transform Coding Using the Residual Quadtree (RQT)," retrieved from: http://www.hhi.fraunhofer.de/fields-of-competence/image-processing/research-groups/image-video-coding/hevc-high-efficiency-video-coding/transform-coding-using-the-residual-quadtree-rqt.html, Mar. 6, 2017, 4 pp.

Huang H., et al., "EE2.1: Quadtree plus binary tree structure integration with JEM tools," Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-C0024, 5 pp.

(56) References Cited

OTHER PUBLICATIONS

Li et al., "Multi-Type-Tree," Joint Collaborative Exploration Team (JVET) of ITU-T SG 16 WP 3 and ISO/IEC JTC1/SC29/WG11, 4th Meeting: Chengdu, CN, Oct. 15-21, 2016, JVET-D0117r1, 3 pp.
Mediatek Inc: "Block partitioning structure for next generation video coding," ITU-T SG16 Meeting, Oct. 12, 2015-Oct. 23, 2015, Geneva, CH, No. T13-SG16-C-0966, Sep. 28, 2015 (Sep. 28, 2015), XP030100738, 8 pp.
An J., et al., "Block partitioning structure for next generation video coding," MPEG doc. m37524 and ITU-T SG16 Doc. COM16-C966-E, Oct. 2015, pp. 1-7.
Leannec et al., "Asymmetric Coding Units in QTBT," Joint Video Exploration Team (JVET) of ITU-T SG 16 WP 3 and ISO/IEC JTC 1/SC 29/WG 11; 4th Meeting, Chengdu, CN; Oct. 15-21, 2016, No. JVET-D0064, 10 pp.
Response to Written Opinion filed in PCT/US2017/023351 submitted Jan. 19, 2018, 6 pp.
Written Opinion issued in International Application No. PCT/US2017/023351 dated Mar. 19, 2018, 9 pp.
U.S. Appl. No. 15/862,203, filed Jan. 4, 2018, first named inventor Xiang Li.
International Preliminary Report on Patentability issued in International Application No. PCT/US2017/023351 dated Jun. 13, 2018, 10 pp.
Biswas M., et al., "Multiple Description Wavelet Video Coding Employing a New Tree Structure", 2008 IEEE Transactions on Circuits and Systems for Video Technology, vol. 18, No. 10, pp. 1361-1368, Sep. 19, 2008.
Ma J., et al., "Compressive Video Sampling With Approximate Message Passing Decoding", 2012 IEEE Transactions on Circuits and Systems for Video Technology, vol. 22, No. 9, May 30, 2012, pp. 1354-1364.
Huang H., "EE2.1: Quadtree plus binary tree structure integration with JEM tools, Joint Video Exploration Team (JVET) of ITU-T SG16 WP3 and ISO/IEC JTC1/SC29/WG11 3rd Meeting: Geneva, CH, May 26-Jun. 1, 2016, JVET-:C0024_r1, 5 PP".
Budagavi M., et al., "Core Transform Design in the High Efficiency Video Coding (HEVC) Standard," IEEE Journal of Selected Topics in Signal Processing, Dec. 2013, vol. 7 (6), pp. 1029-1041.
Flynn D., et al., "Overview of the Range Extensions for the HEVC Standard: Tools, Profiles, and Performance", IEEE Transactions on Circuits and Systems for Video Technology, Institute of Electrical and Electronics Engineers, USA, vol. 26, No. 1, Jan. 1, 2016 (Jan. 1, 2016), XP011592176, pp. 4-19, ISSN: 1051-8215, DOI: 10.1109/TCSVT.2015.2478707 [retrieved on Jan. 5, 2016] pp. 11-13, Paragraph V.D.
Leannec, F.L., et al., "Asymmetric Coding Units in QTBT," Joint Video Exploration Team (JVET) of ITU-T SG 16 WP 3 and ISO/IEC JTC 1/SC 29/WG 11; 4th Meeting, Chengdu, CN; Oct. 15-21, 2016, No. JVET-D0064, Oct. 10, 2016, 10 pp.
Russ J.C., et al., "Introduction to Image Processing and Analysis" In: "Introduction to Image Processing and Analysis", Oct. 31, 2007 (Oct. 31, 2007), CRC Press, Boca Raton, FL, USA, XP055462417, pp. 133-142.
Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.
Chen J., et al., "Further Improvements to HMKTA-1.0", 52. VCEG Meeting, Jun. 19, 2015-Jun. 26, 2015, Warsaw, (Video Coding Experts Group of ITU-T SG.16), No. VCEG-AZ07, Jun. 19, 2015 (Jun. 19, 2015), 8 Pages, XP030003885, p. 4, paragraph 2.3.2,section 2.4.2.
"ITU-T H.265, Series H: Audiovisual and Multimedia Systems, Infrastructure of Audiovisual Services—Coding of Moving Video, High Efficiency Video Coding", The International Telecommunication Union, Apr. 2015, 634 Pages, please consider section 7.4.9.6 on p. 102, section 8.5.3.2.6 on p. 141, section 8.5.3.2.7 on pp. 141-145, and section 8.5.3.2.8 on p. 145.

\* cited by examiner

FIG. 8

CODING VIDEO DATA USING A TWO-LEVEL MULTI-TYPE-TREE FRAMEWORK

This application claims the benefit of U.S. Provisional Application No. 62/311,248, filed Mar. 21, 2016, and of U.S. Provisional Application No. 62/401,016, filed Sep. 28, 2016, the entire contents of each of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for organization of coding units (that is, blocks of video data) in block-based video coding. These techniques may be applied to existing or future video coding standards. In particular, these techniques include coding a multi-type-tree, including a region tree and one or more prediction trees. The prediction trees may originate from region tree leaf nodes. Certain information, such as coding tool information, may be signaled in nodes of the region tree, e.g., to enable or disable the coding tools for regions corresponding to the region tree nodes.

In one example, a method of decoding video data includes decoding one or more syntax elements at a region-tree level of a region-tree of a tree data structure for a coding tree block (CTB) of video data, the region-tree having one or more region-tree nodes including zero or more region-tree non-leaf nodes and one or more region-tree leaf nodes, each of the region-tree non-leaf nodes having a first number of child region-tree nodes, the first number being at least four, determining, using the syntax elements at the region-tree level, how the region-tree nodes are split into the child region-tree nodes, decoding one or more syntax elements at a prediction-tree level for each of the region-tree leaf nodes of one or more prediction trees of the tree data structure for the CTB, the prediction trees each having one or more prediction-tree nodes including zero or more prediction-tree non-leaf nodes and one or more prediction-tree leaf nodes, each of the prediction-tree non-leaf nodes having a second number of child prediction-tree nodes, the second number being at least two, each of the prediction leaf nodes defining respective coding units (CUs), determining, using the syntax elements at the prediction-tree level, how the prediction-tree nodes are split into the child prediction-tree nodes, and decoding video data, including prediction data and transform data, for each of the CUs based at least in part on the syntax elements at the region-tree level and the syntax elements at the prediction-tree level.

In another example, a device for decoding video data includes a memory configured to store video data; and a processor implemented in circuitry and configured to: decode one or more syntax elements at a region-tree level of a region-tree of a tree data structure for a coding tree block (CTB) of video data, the region-tree having one or more region-tree nodes including zero or more region-tree non-leaf nodes and one or more region-tree leaf nodes, each of the region-tree non-leaf nodes having a first number of child region-tree nodes, the first number being at least four, determine, using the syntax elements at the region-tree level, how the region-tree nodes are split into the child region-tree nodes, decode one or more syntax elements at a prediction-tree level for each of the region-tree leaf nodes of one or more prediction trees of the tree data structure for the CTB, the prediction trees each having one or more prediction-tree nodes including zero or more prediction-tree non-leaf nodes and one or more prediction-tree leaf nodes, each of the prediction-tree non-leaf nodes having a second number of child prediction-tree nodes, the second number being at least two, each of the prediction leaf nodes defining respective coding units (CUs), determine, using the syntax elements at the prediction-tree level, how the prediction-tree nodes are split into the child prediction-tree nodes, and decode video data, including prediction data and transform data, for each of the CUs based at least in part on the syntax elements at the region-tree level and the syntax elements at the prediction-tree level.

In another example, a device for decoding video data includes means for decoding one or more syntax elements at a region-tree level of a region-tree of a tree data structure for a coding tree block (CTB) of video data, the region-tree having one or more region-tree nodes including zero or more region-tree non-leaf nodes and one or more region-tree leaf nodes, each of the region-tree non-leaf nodes having a first number of child region-tree nodes, the first number being at least four, means for determining, using the syntax elements at the region-tree level, how the region-tree nodes are split into the child region-tree nodes, means for decoding one or more syntax elements at a prediction-tree level for each of the region-tree leaf nodes of one or more prediction trees of the tree data structure for the CTB, the prediction trees each having one or more prediction-tree nodes including zero or more prediction-tree non-leaf nodes and one or more prediction-tree leaf nodes, each of the prediction-tree non-leaf nodes having a second number of child prediction-tree nodes, the second number being at least two, each of the prediction leaf nodes defining respective coding units (CUs), means for determining, using the syntax elements at the prediction-tree level, how the prediction-tree nodes are split into the child prediction-tree nodes, and means for decoding video data, including prediction data and transform data, for each of the CUs based at least in part on the syntax elements at the region-tree level and the syntax elements at the prediction-tree level.

In another example, a computer-readable storage medium has stored thereon instructions that, when executed, cause a processor to decode one or more syntax elements at a region-tree level of a region-tree of a tree data structure for a coding tree block (CTB) of video data, the region-tree having one or more region-tree nodes including zero or more region-tree non-leaf nodes and one or more region-tree leaf nodes, each of the region-tree non-leaf nodes having a first number of child region-tree nodes, the first number being at least four, determine, using the syntax elements at the region-tree level, how the region-tree nodes are split into the child region-tree nodes, decode one or more syntax elements at a prediction-tree level for each of the region-tree leaf nodes of one or more prediction trees of the tree data structure for the CTB, the prediction trees each having one or more prediction-tree nodes including zero or more prediction-tree non-leaf nodes and one or more prediction-tree leaf nodes, each of the prediction-tree non-leaf nodes having a second number of child prediction-tree nodes, the second number being at least two, each of the prediction leaf nodes defining respective coding units (CUs), determine, using the syntax elements at the prediction-tree level, how the prediction-tree nodes are split into the child prediction-tree nodes, and decode video data, including prediction data and transform data, for each of the CUs based at least in part on the syntax elements at the region-tree level and the syntax elements at the prediction-tree level.

The details of one or more examples are set forth in the accompanying drawings and the description below. Other features, objects, and advantages will be apparent from the description and drawings, and from the claims.

BRIEF DESCRIPTION OF DRAWINGS

FIG. 8 is a conceptual diagram illustrating an example of OBMC as applied in HEVC, that is, PU-based OBMC.

DETAILED DESCRIPTION

Figure 1:
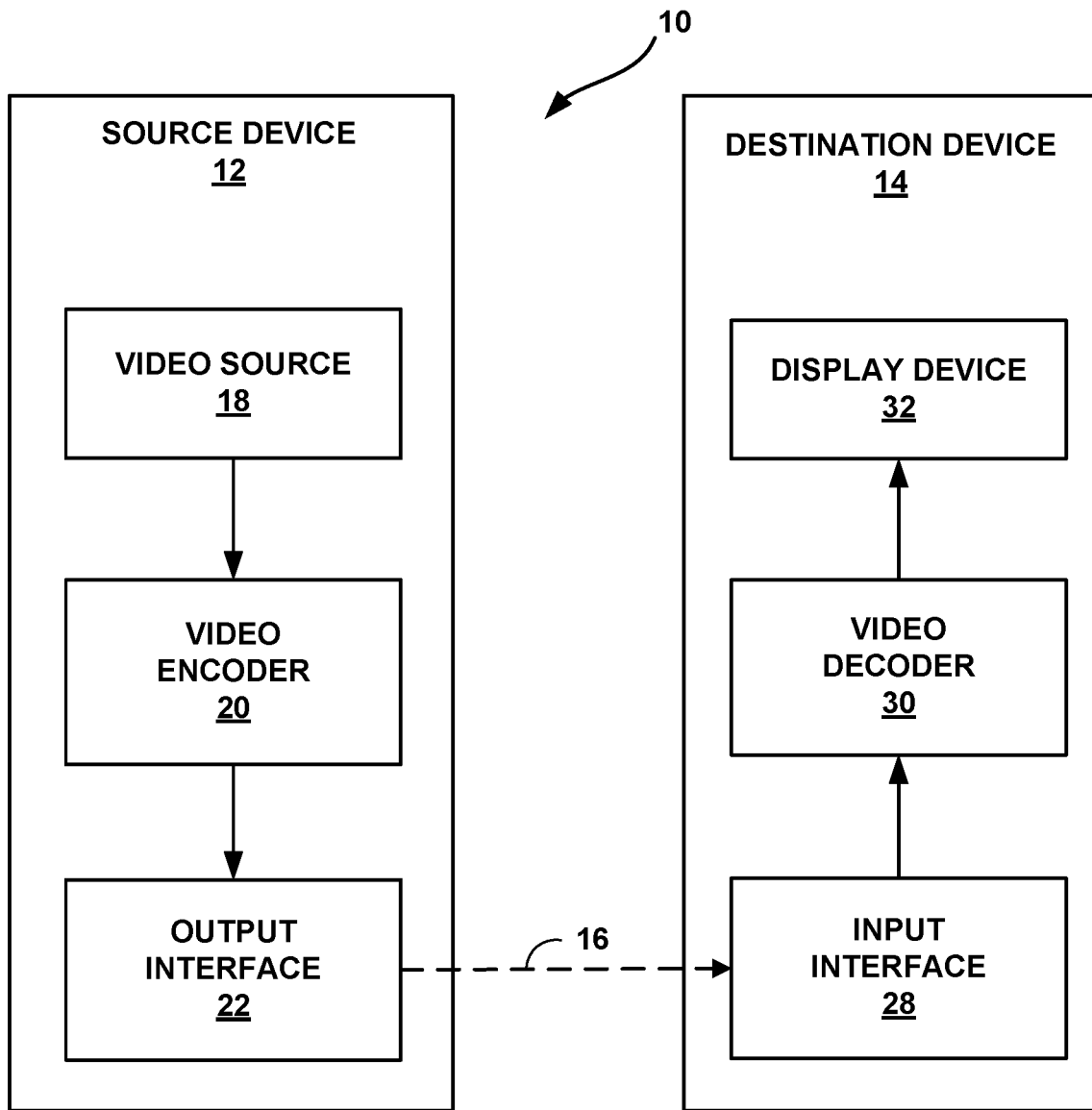
FIG. 1 is a block diagram illustrating an example video encoding and decoding system that may utilize techniques for coding video data using a two-level multi-type-tree framework.

In video coding, tree data structures may be used to represent video block partitioning. For example, in High Efficiency Video Coding (HEVC), a quadtree is used to represent partitioning of a coding tree block (CTB) into coding units (CUs). Other tree structures have been used for other block-based video coding paradigms. For example, binary trees have been used to represent partitioning of blocks into either two horizontal or two vertical blocks. Multi-type trees, such as quadtree binary trees (QTBTs), may be used to combine quadtrees and binary trees.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). As examples, design aspects of HEVC are discussed below, focusing on the block partition. The common concepts and terminology for HEVC and other techniques are discussed below.

A multi-type-tree structure is a kind of flat structure. All tree types are equally important for a tree node, which makes multi-type-tree traversal complicated. In addition, in conventional coding techniques related to multi-type-tree structures, some coding tools are not compatible with multi-type-tree structures and/or QTBT structures. For example, overlapped block motion compensation (OBMC) is less efficient when used with multi-type-trees or QTBTs, because there are no PU boundaries in these tree types. In this case, OBMC can only be applied to one side of CU boundaries. Likewise, overlapped transform techniques cannot be applied, since there are no PU boundaries and overlapped transforms are not allowed to cross CU boundaries. It is also difficult to define a region where sub-blocks can share the same quantization parameter (QP) prediction values to efficiently signal QP variation when using multi-type-tree or QTBT structures.

The techniques of this disclosure may be applied to overcome these or other such challenges. The various techniques discussed below may be applied individually or in any combination.

In general, according to ITU-T H.265, a video picture may be divided into a sequence of coding tree units (CTUs) (or largest coding units (LCUs)) that may include both luma and chroma samples. Alternatively, CTUs may include monochrome data (i.e., only luma samples). Syntax data within a bitstream may define a size for the CTU, which is a largest coding unit in terms of the number of pixels. A slice includes a number of consecutive CTUs in coding order. A video picture may be partitioned into one or more slices. Each CTU may be split into coding units (CUs) according to a quadtree. In general, a quadtree data structure includes one node per CU, with a root node corresponding to the CTU. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CTU may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTU may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the CTU with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned CTU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In HEVC, leaf-CU may include one or more prediction units (PUs). In general, a PU represents a spatial area corresponding to all or a portion of the corresponding CU, and may include data for retrieving and/or generating a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. The RQT may also be referred to as a transform tree. In some examples, the intra-prediction mode may be signaled in the leaf-CU syntax, instead of the RQT. As another example, when the PU is inter-mode encoded, the PU may include data defining motion information, such as one or more motion vectors, for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

Also in HEVC, a leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs in HEVC may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTU (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures, starting with a random access point (RAP) picture. A video sequence may include syntax data in a sequence parameter set (SPS) that describes characteristics of the video sequence. Each slice of a picture may include slice syntax data that describes an encoding mode for the respective slice. Video coders typically operate on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

FIG. 1 is a block diagram illustrating an example video encoding and decoding system 10 that may utilize techniques for coding video data using a two-level multi-type-tree framework. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding video data using a two-level multi-type-tree framework. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding video data using a two-level multi-type-tree framework may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

Video encoder 20 and video decoder 30 may be configured to perform any of the various techniques discussed below, alone or in any combination.

The techniques of this disclosure include a two-level multi-type-tree structure. At a first level (referred to as "region-tree level"), a picture or block of video data is split into regions, each with one or multiple tree types which are able to partition a large block into small blacks quickly (e.g., using a quadtree or hexadecimal-tree). At the second level (prediction level), a region is further split with multi-type-tree (including no further split). The leaf node of a prediction tree is referred to in this disclosure as a coding unit (CU), for simplicity.

Accordingly, the following may apply to the multi-type-tree of this disclosure:

a) The root of a prediction tree is a leaf node of a region tree.
b) "No further split" is regarded as a special tree type for both region tree and prediction tree.
c) Video encoder 20 may signal, and video decoder 30 may receive, max tree depths separately for the region tree and the prediction tree. That is, the max depth of each level of the structure (i.e., region tree and prediction tree) may be controlled by an independent variable. Alternatively, the max total depth of the structure may be signaled as the sum of the max depth of each level. In one example, the max depth(s) is/are signaled in a sequence parameter set (SPS), a picture parameter set (PPS), and/or a slice header. In another example, the max depth of region tree and the max depth of the prediction tree on top of to each depth of region tree are signaled in slice header. For example, the max depth of region tree is signaled as 3. Then four values are further signaled to indicate the max depths of prediction tree on top of depth0, depth1, depth2, and depth3 of the region tree.
d) Alternatively, the tree depth information of region tree and prediction tree may be signaled jointly. For instance, given the biggest CTU size, a max region tree depth may be signaled first in a sequence parameter set (SPS), a Picture Parameter Set (PPS), and/or slice header. Then a relative offset against the region tree root level may be signaled, indicating the starting level for the prediction tree. Last, prediction tree level information may be signaled. Note that different temporal level pictures may or may not have the same tree depth constraint. For instance, a lower temporal level picture may have a larger tree depth (for either region tree or prediction tree, or both), while higher temporal level picture may have a smaller tree depth (for either region tree or prediction tree, or both). The relative tree depth offset between region tree and prediction may or may not be the same.
e) "Force split" (automatic split without signaling when reaching picture/slice/tile boundary) may be only at region tree level or only at prediction tree level, but not both. When the lowest level of region tree still cannot include all the boundary pixels, boundary padding is invoked to include the boundary pixels using the lowest region tree level. Note that the tree depth due to "force split" need not be constrained by the predefined or signaled max tree depths.
f) Region tree depth and prediction tree depth may or may not overlap with each other. It can be derived from the tree depth information signaled or signaled as an individual flag in a sequence parameter set (SPS), a Picture Parameter Set (PPS) and/or slice header.
g) Splitting information of prediction trees within a region tree leaf node may be signaled before CU information (including but not limited to skip flag, merge index, inter/intra mode, prediction info, motion info, transform info, residues and quantization info) of the region tree leaf so that during parsing, the number of CUs within a region tree leaf node is known before parsing the first CU within the region tree leaf node.

In addition or in the alternative, video encoder 20 and video decoder 30 may be configured to apply or signal certain coding tools at the region-tree level. In other words, the availability of certain coding tools may depend on the region tree level. The coding tool can be applied across CU boundaries as long as these CUs belong to the same region tree node or region tree leaf node. Some coding tools may only be applied and/or signaled at a leaf node of a region tree. For example:

a. OBMC: A flag or mode information can be signaled at region-tree leaf node level to indicate whether OBMC is enabled within the region associated within the region tree leaf. If OBMC is enabled, the CU boundaries within the region are treated in the same way as PU boundaries in HEVC or sub-PU boundary within a CU in JEM. That is, OBMC can be applied to each side of CU boundaries within the region associated with the region tree leaf node.

1. Whether OBMC is enabled may be derived or partially derived based on the coded information, such as the size of the region. For example, when the region size is larger than a threshold (such as 16×16), OBMC may be regarded as on, such that no signaling is necessary. When the region size is smaller than the threshold, the flag or OBMC mode information may be signaled.

ii. Overlapped transform: a transform having the block size covers the region of all or a group of prediction blocks within a region tree leaf node and is used to code the predicted residues.

1. In one example, a flag or transform tree information is signaled at the region-tree leaf node level to indicate whether overlapped transform is used for the region.

a. In one example, furthermore, when the transform tree information is signaled, it should be different from the prediction tree.

b. In another example, a flag or transform tree information is signaled at region-tree leaf node level to indicate whether a single transform, as large as the current region-tree leaf node, is used, or multiple transforms, each aligned with the prediction block size, are used.

2. When overlapped transform is used for the region, coded block flag (CBF) information of all CUs inside the region may be signaled at the region-tree leaf level, instead of the CU level.

3. In one example, when overlapped transform is applied for a region tree leaf node, the OBMC is always applied for the region tree leaf node.

iii. Super skip/merge mode: A flag or mode information can be signaled at region-tree leaf level to indicate that all CUs within the region are coded in skip mode or merge mode, so that no mode information is signaled at CU level.

iv. Super intra/inter coding mode: A flag or an index of mode information (such as intra mode or inter mode) can be signaled at region-tree leaf level to indicate that CUs shall use the same mode information.

v. Super FRUC mode: A flag or mode information can be signaled at region-tree leaf level to indicate that all CUs within the region tree are coded in FRUC mode.

vi. Super mode information (such as super skip/merge, super intra/inter, and super FRUC) may be signaled only when the number of CUs within a region tree leaf node is larger than a threshold.

1. The threshold may be predefined or signaled in bitstream such as in a VPS, SPS, PPS, or slice header.

In addition or in the alternative, video encoder 20 and video decoder 30 may apply and/or code data representative of coding tools at any node of a region-tree. For example, filtering tools, such as sample adaptive offset (SAO) and/or adaptive loop filter (ALF) may differ from HEVC in that SAO information may be signaled at CTU level, information for filtering tools such as SAO and ALF may be signaled at any node (not necessarily a leaf node) of a region-tree, so that the region to be filtered is the region associated with the node.

In addition or in the alternative, video encoder 20 and video decoder 30 may be configured to use center-side triple tree alike partitioning, on top of HEVC-style coding tree structure. For example, video encoder 20 and video decoder 30 may use new partitions, such as center-side triple tree, in additional to AMP or to replace AMP as PU partitioning types.

In addition or in the alternative, a leaf node of the region tree may provide a balanced point for quantization parameter (QP) delta coding between coding efficiency and complexity. As a neighborhood is well-defined in the region tree, QP predictors may be calculated at leaf nodes of a region tree using top, left, and previously coded QP values. The QP value may change at every CU, and the CUs may share the same base value from their parent region tree node for coding.

Additional examples, either or both of which may be performed by video encoder 20 and video decoder 30, are described in greater detail with respect to FIG. 12 below.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
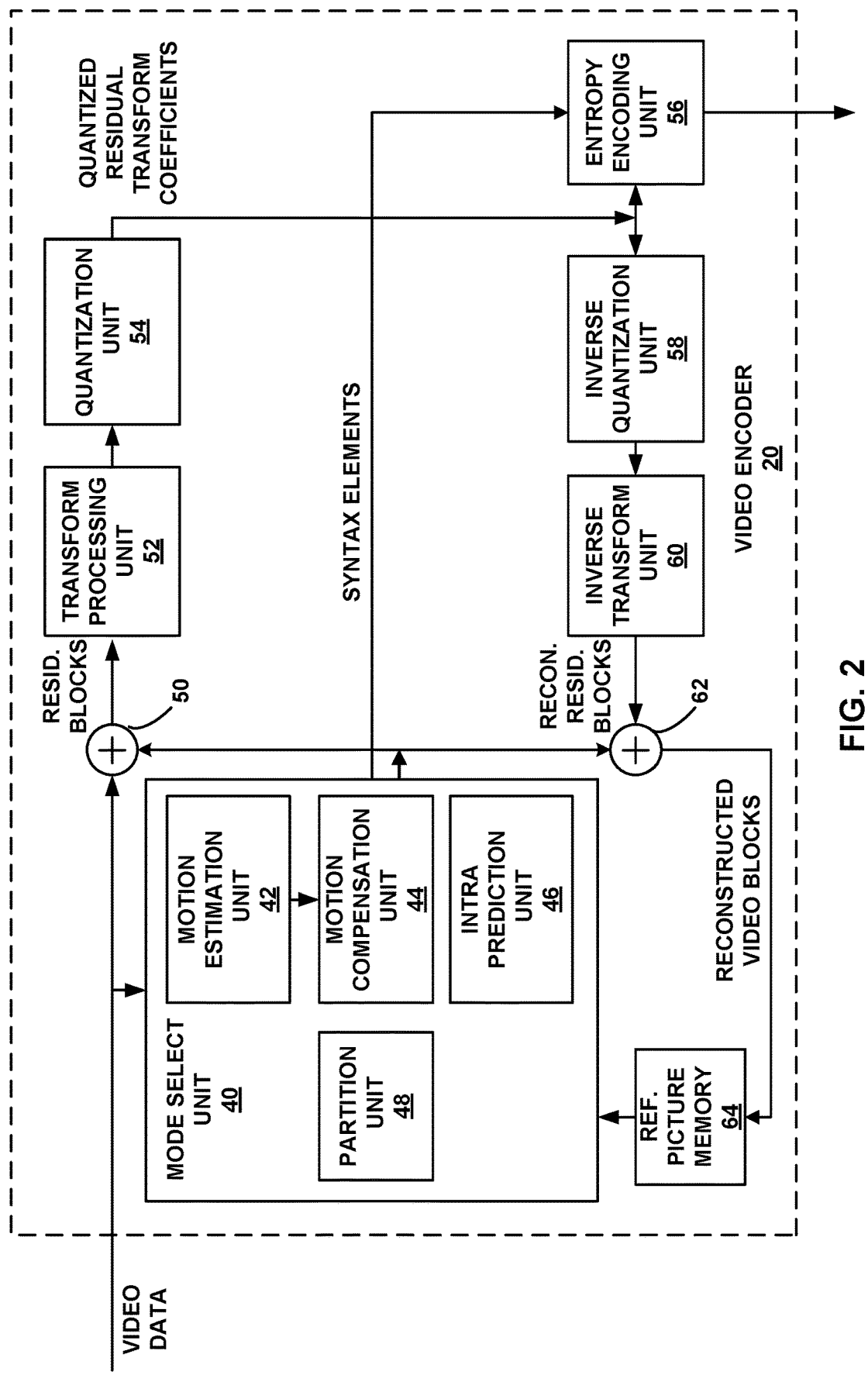
FIG. 2 is a block diagram illustrating an example of a video encoder that may implement techniques for coding video data using a two-level multi-type-tree framework.

FIG. 2 is a block diagram illustrating an example of video encoder 20 that may implement techniques for coding video data using a two-level multi-type-tree framework. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition coding tree blocks of video data using the techniques of this disclosure. That is, partition unit 48 may initially partition a CTB using a region tree of a multi-type-tree, ultimately resulting in one or more region tree leaf nodes. Partition unit 48 may partition the region tree according to quadtree partitioning or hex-tree partitioning, in various examples. Quadtree partitioning includes partitioning each non-leaf node into four child nodes, while hex-tree partitioning includes partitioning each non-leaf node into six child nodes.

Partition unit 48 may further partition each of the region tree leaf nodes using respective prediction trees. The prediction trees may be partitioned as binary trees, center-side-triple trees, and/or quadtrees. That is, partition unit 48 may partition each node of a prediction tree into four equal sized parts (as in a quadtree), two equal sized parts horizontally or vertically (as in a binary tree), or a center region and two smaller side regions horizontally or vertically (as in a center-side-triple tree). Additionally or alternatively, partition unit 48 may partition a node of the prediction tree using asymmetric motion partitioning (AMP). In some examples, the center-side-triple tree partitioning may replace AMP, while in other examples, the center-side-triple tree partitioning may supplement AMP. As explained with respect to FIG. 1, partition unit 48 may generate values for syntax elements indicating how the multi-type-tree for a CTB is partitioned, which may be encoded by entropy encoding unit 56.

Mode select unit 40 may select one of the prediction modes, (intra, inter, or skip), e.g., based on error results (e.g., using rate-distortion analysis), and provide the resulting predicted block to summer 50 to generate residual data and to summer 62 to reconstruct the encoded block for use as a reference frame. Mode select unit 40 also provides syntax elements, such as motion vectors (coded according to, e.g., merge or AMVP modes), intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Furthermore, in accordance with the techniques of this disclosure, mode select unit 40 may elect to perform one or more "super modes" for certain prediction trees of a coding tree block (CTB). Such super-modes may include, for example, super skip mode, super merge mode, super intra-mode, super inter-mode, or super FRUC mode. In general, in a super mode, video encoder 20 encodes corresponding "super mode" information at a root node of a prediction-tree (or at a region-tree leaf node) of the CTB, and applies this information to all CUs of the prediction tree, such that video encoder 20 avoids encoding separate corresponding information for the CUs of the prediction tree. For example, for super skip mode, video encoder 20 encodes all CUs of the prediction tree using skip mode, and does not encode any additional prediction information for the CUs. As another example, for super intra- or inter-mode, video encoder 20 would encode intra- or inter-prediction information once for the prediction tree, and apply this same prediction information to all CUs of the prediction tree. Video encoder 20 would encode other information, such as splitting information at the region-tree level and the prediction tree level, as well as transform information, as normal.

In some examples, video encoder 20 only enables a super-mode when a number of CUs included in the prediction tree is larger than a threshold. Video encoder 20 may encode syntax elements defining the threshold, e.g., in a sequence parameter set (SPS), a picture parameter set (PPS), a slice header, a CTB header, or the like.

Moreover, in accordance with the techniques of this disclosure, video encoder 20 may encode syntax elements representing one or more enabled coding tools, and also apply the enabled coding tools during encoding of a CTB or prediction tree of the CTB. For example, video encoder 20 may enable any or all of overlapped block motion compensation (OBMC), overlapped transforms, and/or any of the various super-modes discussed above. Motion compensation unit 44 may be configured to perform OBMC as discussed in greater detail below with respect to, e.g., FIGS. 7 and 8. Transform processing unit 52 may be configured to perform overlapped transforms as discussed above.

In this manner, video encoder 20 of FIG. 2 represents an example of a video encoder configured to encode one or more syntax elements at a region-tree level of a region tree of a tree data structure for a coding tree block (CTB) of video data, the region tree having one or more region tree leaf nodes, encode one or more syntax elements at a prediction tree level for each of the region tree leaf nodes of one or more prediction trees of the tree data structure for the CTB, the prediction trees having one or more prediction leaf nodes defining respective coding units (CUs), and encode video data for each of the CUs.

Figure 3:
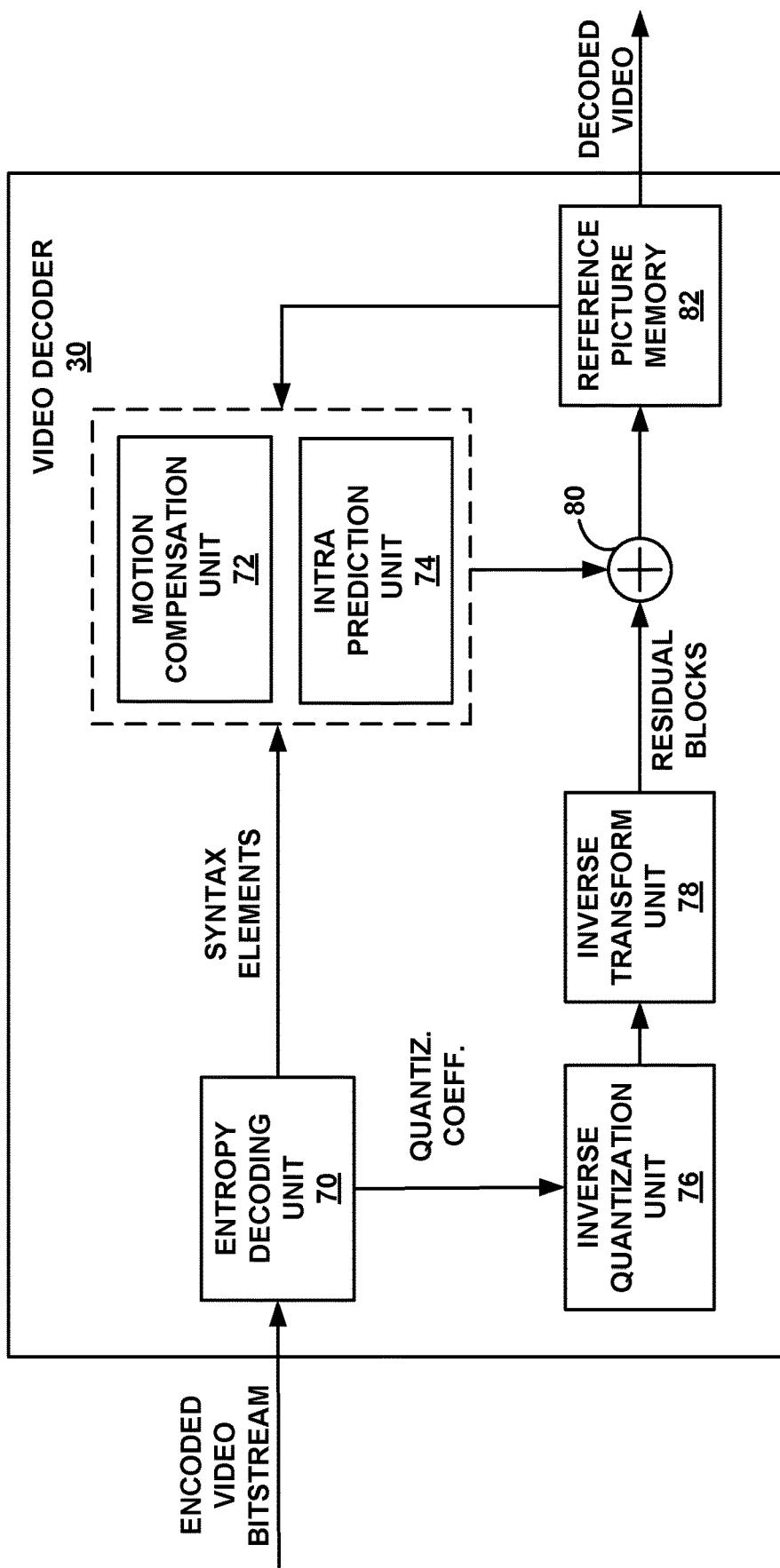
FIG. 3 is a block diagram illustrating an example of a video decoder that may implement techniques for coding video data using a two-level multi-type-tree framework.

FIG. 3 is a block diagram illustrating an example of video decoder 30 that may implement techniques for coding video data using a two-level multi-type-tree framework. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

The syntax elements at the coding tree block (CTB) level may include syntax elements indicating how a multi-type-tree of a CTB is partitioned. In particular, entropy decoding unit 70 may decode one or more syntax elements of a CTB at a region tree level, ultimately yielding one or more region tree leaf nodes. Each region tree leaf node may be associated with corresponding prediction tree syntax elements. The prediction tree syntax elements may indicate how the corresponding region tree leaf node is partitioned, e.g., according to horizontal or vertical binary tree partitioning, horizontal or vertical center-side-triple partitioning, quadtree partition, or asymmetric motion partitioning (AMP). The prediction trees may ultimately yield one or more coding units (CUs).

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Furthermore, in accordance with the techniques of this disclosure, entropy decoding unit 70 may decode syntax elements representing whether one or more "super modes" for certain prediction trees of a coding tree block (CTB) are enabled. Such super-modes may include, for example, super skip mode, super merge mode, super intra-mode, super inter-mode, or super FRUC mode. In general, in a super mode, video decoder 30 decodes corresponding "super mode" information at a root node of a prediction-tree (or at a region-tree leaf node) of the CTB, and applies this information to all CUs of the prediction tree, such that video decoder 30 avoids decoding separate corresponding information for the CUs of the prediction tree. For example, for super skip mode, video decoder 30 decodes all CUs of the prediction tree using skip mode, and does not decode any additional prediction information for the CUs. As another example, for super intra- or inter-mode, video decoder 30 would decode intra- or inter-prediction information once for the prediction tree, and apply this same prediction information to all CUs of the prediction tree. Video decoder 30 would decode other information, such as splitting information at the region-tree level and the prediction tree level, as well as transform information, as normal.

In some examples, video decoder 30 only enables a super-mode when a number of CUs included in the prediction tree is larger than a threshold. Video decoder 30 may decode syntax elements defining the threshold, e.g., in a sequence parameter set (SPS), a picture parameter set (PPS), a slice header, a CTB header, or the like.

Moreover, in accordance with the techniques of this disclosure, video decoder 30 may decode syntax elements representing one or more enabled coding tools, and also apply the enabled coding tools during decoding of a CTB or prediction tree of the CTB. For example, video decoder 30 may enable any or all of overlapped block motion compensation (OBMC), overlapped transforms, and/or any of the various super-modes discussed above. Motion compensation unit 72 may be configured to perform OBMC as discussed in greater detail below with respect to, e.g., FIGS. 7 and 8. Inverse transform unit 78 may be configured to perform overlapped transforms as discussed above.

In this manner, video decoder 30 of FIG. 3 represents an example of a video decoder including a memory configured to store video data; and a processor implemented in circuitry and configured to: decode one or more syntax elements at a region-tree level of a region-tree of a tree data structure for a coding tree block (CTB) of video data, the region-tree having one or more region-tree nodes including zero or more region-tree non-leaf nodes and one or more region-tree leaf nodes, each of the region-tree non-leaf nodes having a first number of child region-tree nodes, the first number being at least four, determine, using the syntax elements at the region-tree level, how the region-tree nodes are split into the child region-tree nodes, decode one or more syntax elements at a prediction-tree level for each of the region-tree leaf nodes of one or more prediction trees of the tree data structure for the CTB, the prediction trees each having one or more prediction-tree nodes including zero or more prediction-tree non-leaf nodes and one or more prediction-tree leaf nodes, each of the prediction-tree non-leaf nodes having a second number of child prediction-tree nodes, the second number being at least two, each of the prediction leaf nodes defining respective coding units (CUs), determine, using the syntax elements at the prediction-tree level, how the prediction-tree nodes are split into the child prediction-tree nodes, and decode video data, including prediction data and transform data, for each of the CUs based at least in part on the syntax elements at the region-tree level and the syntax elements at the prediction-tree level.

Figure 4:
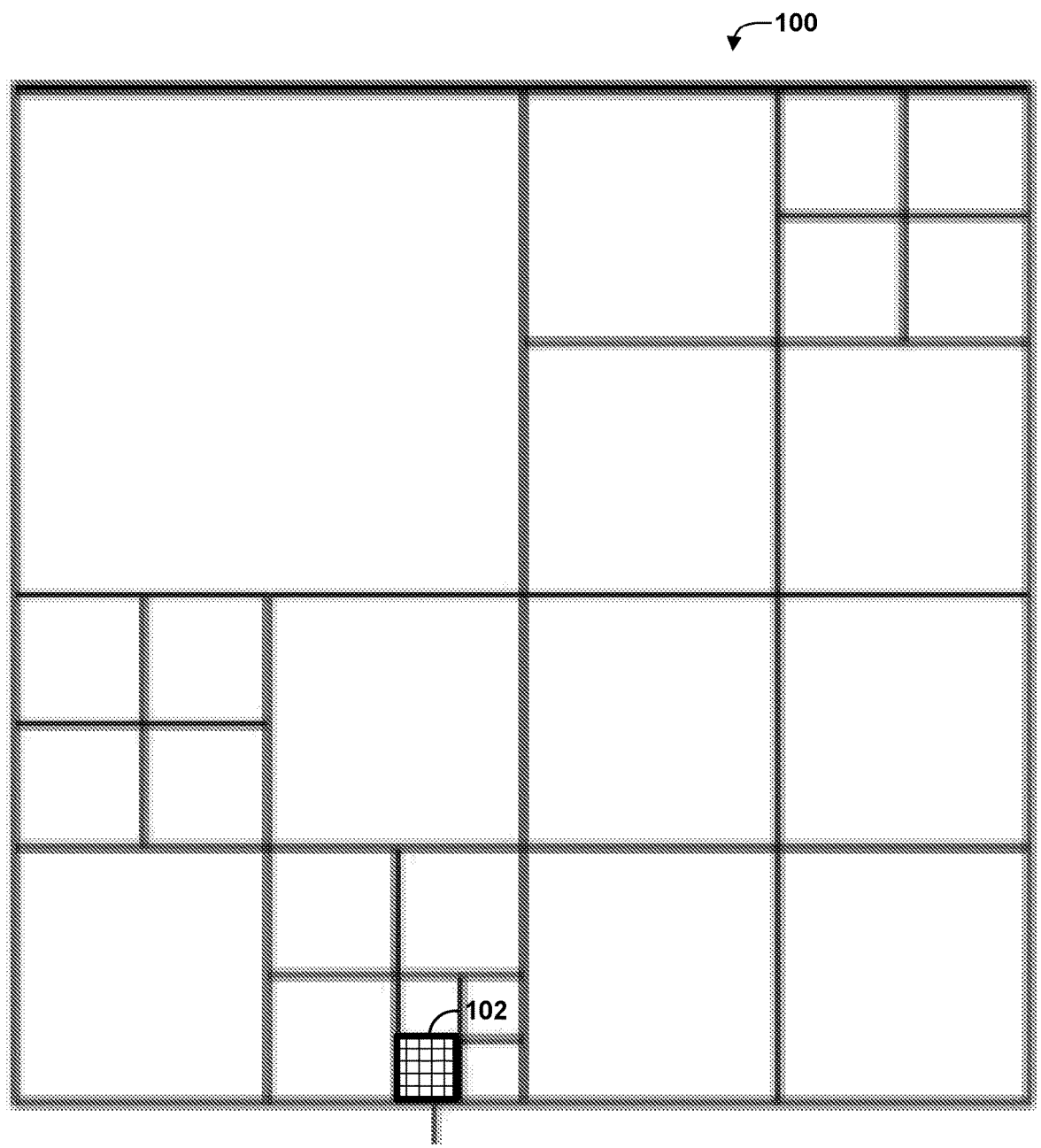
FIG. 4 is a block diagram illustrating an example coding tree block (CTB).

FIG. 4 is a block diagram illustrating an example coding tree block (CTB) 100. In HEVC, the largest coding unit in a slice is called a coding tree block (CTB). A CTB, such as CTB 100, contains a quadtree data structure (or simply, quadtree), the nodes of which correspond to coding units (CUs). In particular, a root node of the quadtree data structure corresponds to the CTB. Each node in the quadtree data structure is either a leaf node (having no child nodes), or a parent node having four child nodes. CU 102 represents one example of a CU corresponding to a leaf node of the quadtree. The size of a CTB ranges from 16×16 pixels to 64×64 pixels in the HEVC main profile (although technically, 8×8 CTB sizes can be supported). A CTB may be recursively split into coding units (CU) in a quadtree manner, such as shown in FIG. 4. Leaf nodes of the quadtree data structure correspond to CUs that include prediction units (PUs) and transform units (TUs).

A CU could be the same size of a CTB, although it can be as small as 8×8. Each coding unit may be coded with one prediction mode, which could be either intra mode or inter mode. When a CU is inter-coded (i.e., inter-mode prediction is applied), the CU may be further partitioned into 2 or 4 prediction units (PUs) or become just one PU when further partitioning does not apply. When two PUs are present in one CU, they can be half size rectangles or two rectangle size with ¼ or ¾ size of the CU.

Figure 5:
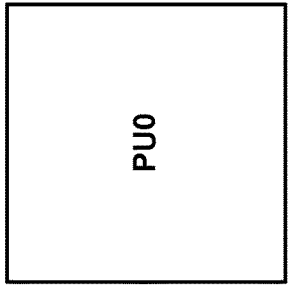
FIG. 5 is a block diagram illustrating example prediction units (PUs) of a CU.
Figure 5:
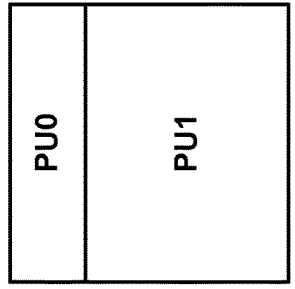
Figure 5:
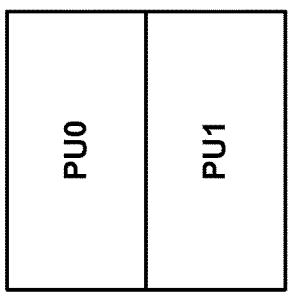
Figure 5:
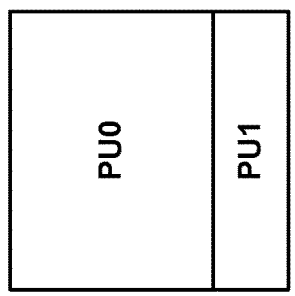
Figure 5:
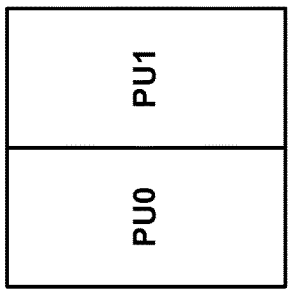
Figure 5:
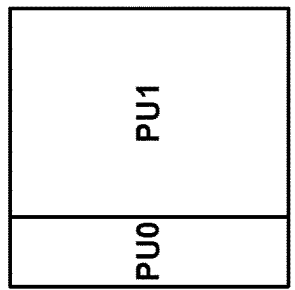
Figure 5:
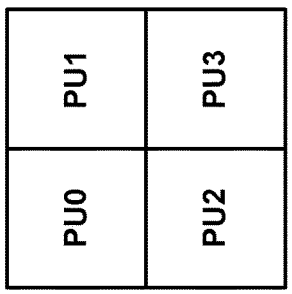
Figure 5:
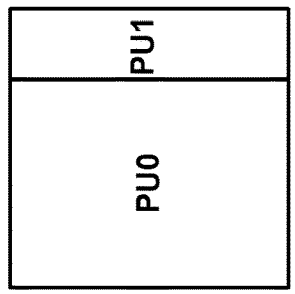

FIG. 5 is a block diagram illustrating example prediction units (PUs) of a CU. In HEVC, there are eight partition modes for a CU coded with inter prediction mode, i.e., PART_2N×2N, PART_2N×N, PART_N×2N, PART_N×N, PART_2N×nU, PART_2N×nD, PART_nL×2N and PART_nR×2N, as shown in FIG. 5. When the CU is inter coded, one set of motion information is present for each PU. In addition, according to HEVC, each PU is coded with a unique inter-prediction mode to derive the set of motion information. When a CU is intra coded according to HEVC, 2N×2N and N×N are the only permissible PU shapes, and within each PU a single intra prediction mode is coded (while chroma prediction mode is signalled at CU level). The N×N intra PU shapes are only allowed when the current CU size is equal to the smallest CU size defined in SPS, according to HEVC.

Figure 6:
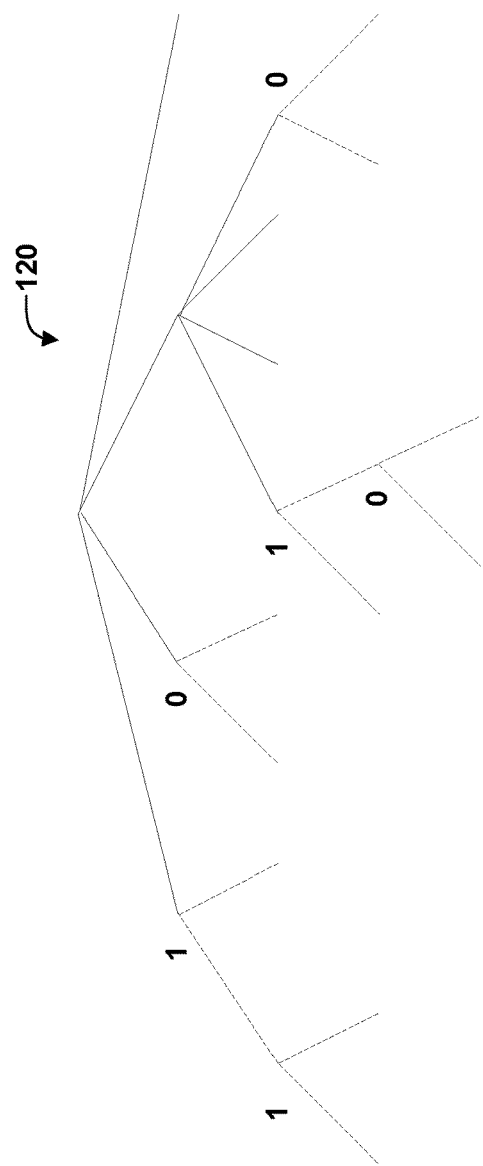
FIG. 6 is a conceptual diagram illustrating an example quadtree binary tree (QTBT) structure, and a corresponding CTB.
Figure 6:
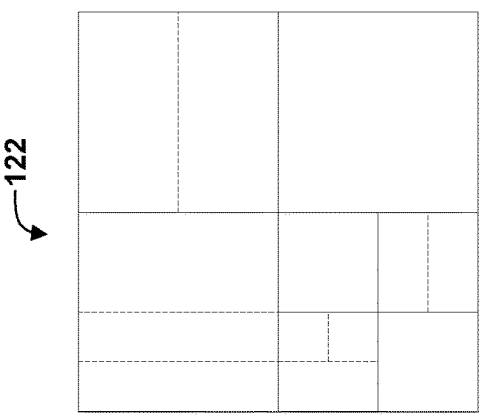

FIG. 6 is a conceptual diagram illustrating an example quadtree binary tree (QTBT) structure 120, and a corresponding CTB 122. In VCEG proposal COM16-C966 (J. An, Y.-W. Chen, K. Zhang, H. Huang, Y.-W. Huang, and S. Lei., "Block partitioning structure for next generation video coding," International Telecommunication Union, COM16-C966, September 2015), a quad-tree-binary-tree (QTBT) was proposed for future video coding standard beyond HEVC. Simulations showed the proposed QTBT structure is more efficient than quad-tree structure in used HEVC.

In the proposed QTBT structure of COM16-C966, a CTB is firstly partitioned by quadtree, where the quadtree splitting of one node can be iterated until the node reaches the minimum allowed quadtree leaf node size (MinQTSize). If the quadtree leaf node size is not larger than the maximum allowed binary tree root node size (MaxBTSize), it can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node is named a CU, which is used for prediction (e.g., intra-picture or inter-picture prediction) and transform without any further partitioning.

There are two splitting types according to COM16-C966: symmetric horizontal splitting and symmetric vertical splitting, in the binary tree splitting.

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quad-tree leaf nodes may have a size from 16×16 (i.e., the MinQTSize) to 128×128 (i.e., the CTU size). If the leaf quad-tree node is 128×128, it will not be further split by the binary tree, since the size exceeds the MaxBTSize (i.e., 64×64). Otherwise, the leaf quad-tree node will be further partitioned by the binary tree. Therefore, the quad-tree leaf node is also the root node for the binary tree and has the binary tree depth as 0.

When the binary tree depth reaches MaxBTDepth (4, in one example), it implies that no further splitting is permitted. When the binary tree node has width equal to MinBTSize (4, in one example), it implies no further horizontal splitting is permitted. Similarly, when the binary tree node has height equal to MinBTSize, it implies no further vertical splitting is permitted. The leaf nodes of the binary tree are named CUs, and are further processed according to prediction and transform without any further partitioning.

CTB 122 of FIG. 6 represents an example of block partitioning by using QTBT, and QTBT 120 of FIG. 6 represents an example QTBT corresponding to CTB 122. The solid lines represent quadtree splitting, and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting in this example. For the quad-tree splitting, there is no need to indicate the splitting type, since it always split a block horizontally and vertically into 4 sub-blocks with an equal size. Accordingly, video encoder 20 may encode, and video decoder 30 may decode, syntax elements (such as splitting information) for a region tree level of QTBT 120 (i.e., the solid lines) and syntax elements (such as splitting information) for a prediction tree level of QTBT 120 (i.e., the dashed lines). Video encoder 20 may encode, and video decoder 30 may decode, video data, such as prediction and transform data, for CUs of prediction-tree leaf nodes of the prediction trees of QTBT 120.

Li et al., U.S. Provisional Application No. 62/279,233, filed Jan. 15, 2016, describes a multi-type-tree structure. With the method of the '233 provisional application, a tree node may be further split with multiple tree types, such as binary tree, symmetric center-side tree, and quad-tree. Simulations showed that the multi-type-tree structure was much more efficient than quad-tree-binary-tree structure.

In the example of QTBT 120, a region-tree level includes quadtrees (where each non-leaf node includes four child nodes) and a prediction-tree level includes binary trees (where each non-leaf node includes two child nodes). In general, however, in accordance with the techniques of this disclosure, a region-tree may include non-leaf nodes having a first number of nodes that is equal to or greater than four (e.g., four, five, six, etc. nodes), and each region-tree leaf node may act as a root node for a prediction-tree having a second number of nodes that is equal to or greater than two (e.g., two, three, four, etc. nodes). Each prediction-tree leaf node may correspond to a CU, which in accordance with the techniques of this disclosure, includes prediction and transform information, but which need not include any further splitting information. Thus, prediction units and transform units, according to examples of the techniques of this disclosure, may be the same size as CUs including the prediction units and transform units.

Figure 7:
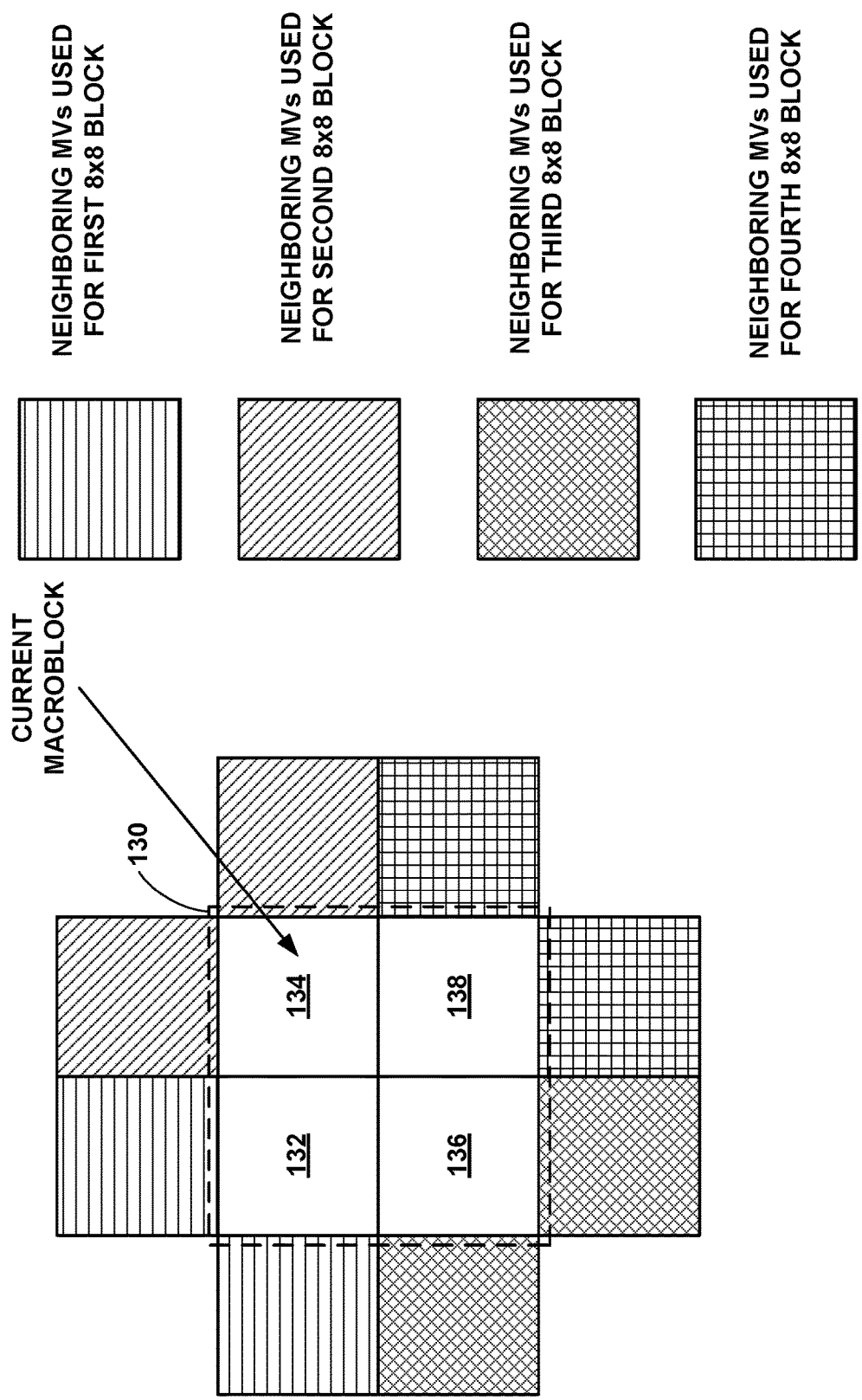
FIG. 7 is a conceptual diagram illustrating a block coded using overlapped block motion compensation (OBMC).

FIG. 7 is a conceptual diagram illustrating a block 130 coded using overlapped block motion compensation (OBMC). OBMC was proposed in the development of H.263 (Video Coding for Low Bitrate Communication, document Rec. H.263, ITU-T, April, 1995). In H.263, OBMC is performed on 8×8 blocks, and motion vectors of two connected neighboring 8×8 blocks are used for a current block, such as current block 130 of FIG. 7. For example, for a first 8×8 block 132 in current block 130, besides its own motion vector, the above and left neighboring motion vector are also applied to generate two additional prediction blocks. In this way, each pixel in the first 8×8 block 132 has three prediction values, and a weighted average of these three prediction values is used as the final prediction. A second 8×8 block 134 is predicted using its own motion vector, as well as motion vectors of the above and right neighboring blocks. A third 8×8 block 136 is predicted using its own motion vector, as well as a motion vector of the left neighboring block. A fourth 8×8 block 138 is predicted using its own motion vector, as well as motion vectors of the right neighboring block.

When a neighboring block is not coded or is coded using an intra mode, i.e., the neighboring block does not have an available motion vector, a motion vector of the current 8×8 block is used as the neighboring motion vector. Meanwhile, for the third 8×8 block 136 and the fourth 8×8 block 138 of current block 130 (as shown in FIG. 7), the below neighboring block is not used. In other words, for each MB, no motion information from MBs below it will be used to reconstruct the pixels of the current MB during OBMC.

Figure 8:
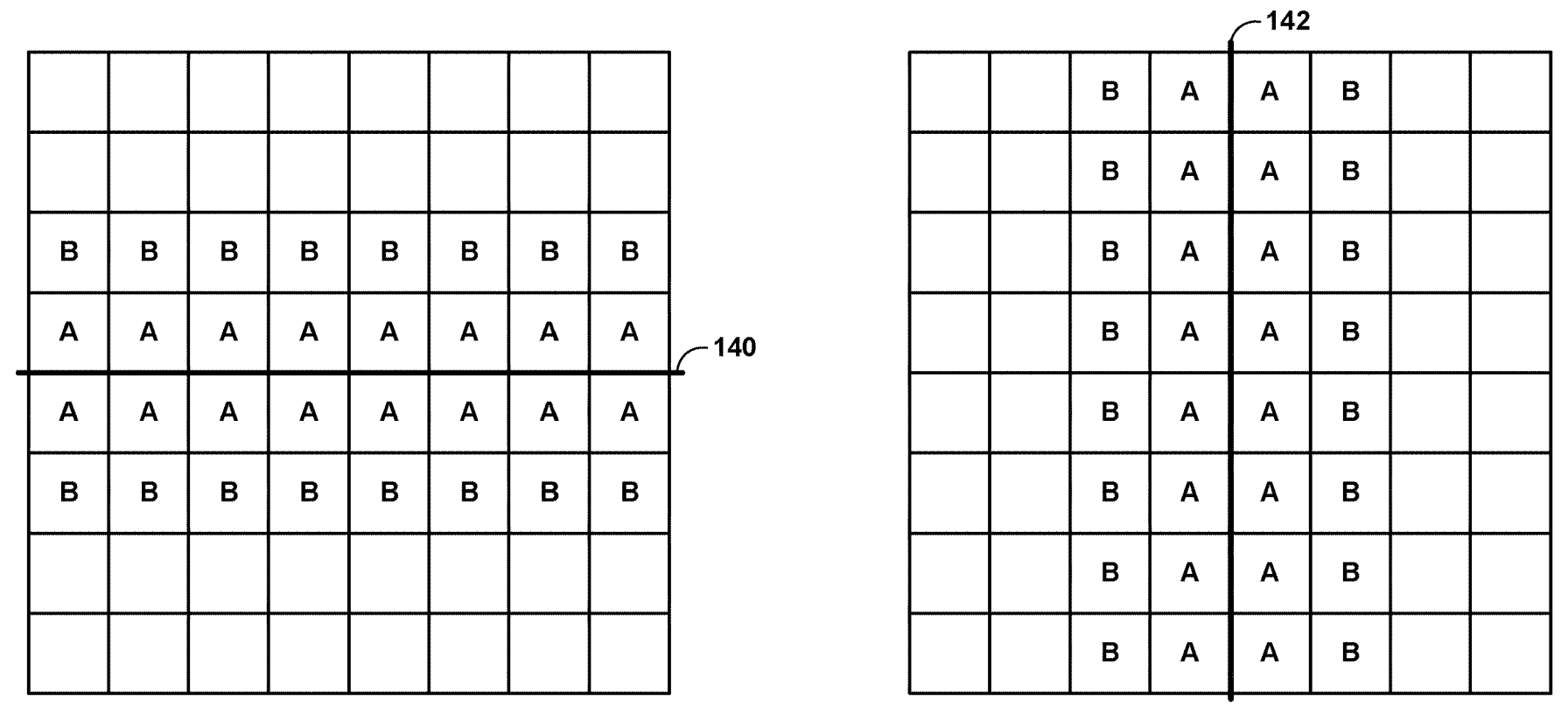

FIG. 8 is a conceptual diagram illustrating an example of OBMC as applied in HEVC, that is, PU-based OBMC. Chien et al., U.S. application Ser. No. 13/678,329, filed Nov. 15, 2012, and Guo et al., U.S. application Ser. No. 13/311,834, filed Dec. 6, 2011, describe application of OBMC to smooth PU boundaries in HEVC, such as boundaries 140, 142. An example of the methods proposed in the Chien and Guo applications is shown in FIG. 8. For example, when a CU contains two (or more) PUs, lines/columns near the PU boundary are smoothed by OBMC, according to the techniques of these applications. For pixels marked with "A" or "B" in PU0 or PU1, two prediction values are generated, i.e., by applying motion vectors of PU0 and PU1 respectively, and a weighted average of the prediction values is used as the final prediction.

Figure 9:
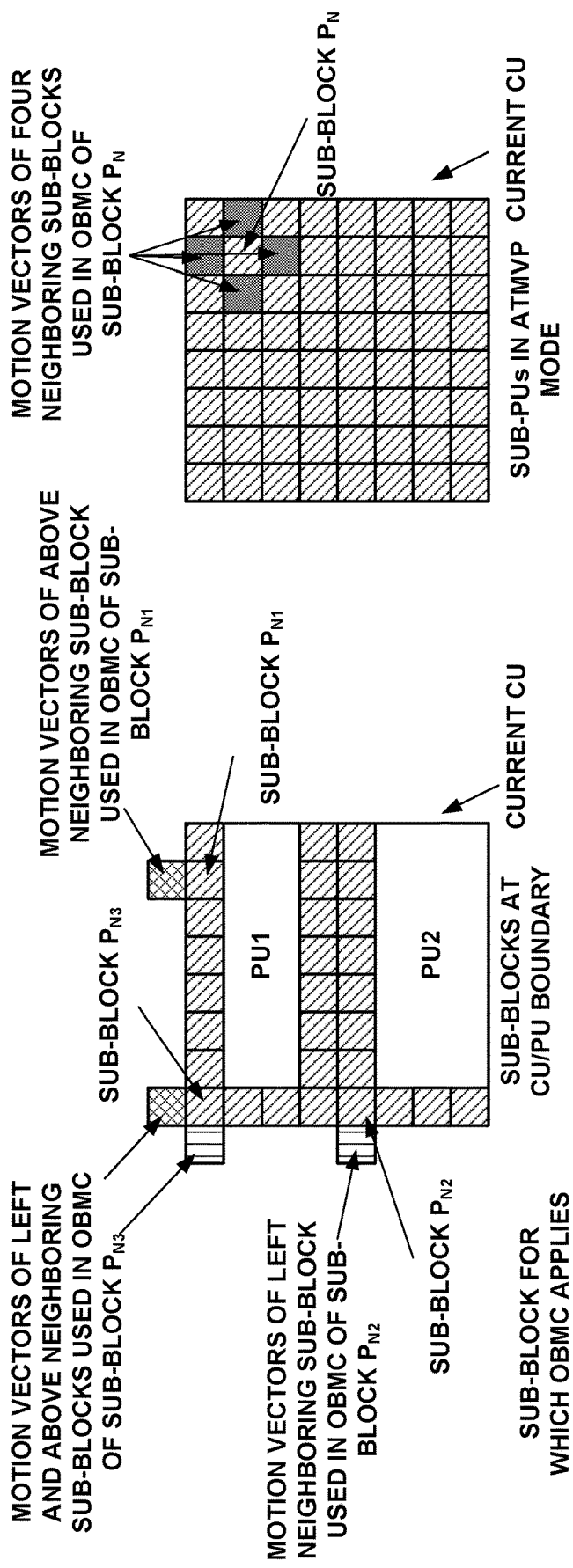
FIG. 9 is a conceptual diagram illustrating an example of performing sub-PU level OBMC.

FIG. 9 is a conceptual diagram illustrating an example of performing sub-PU level OBMC. In the Joint Exploration Test Model 2 (JEM) (J. Chen, E. Alshina, G. J. Sullivan, J.-R. Ohm, J. Boyce "Algorithm description of Joint Exploration Test Model 2," JVET-B1001, February 2016), sub-PU level OBMC is applied. In this example, OBMC is performed for all Motion Compensated (MC) block boundaries except the right and bottom boundaries of a CU. Moreover, OBMC is applied for both luma and chroma components. In HEVC, a MC block corresponds to a PU. In JEM, when a PU is coded with sub-PU mode, each sub-block of the PU is a MC block. To process CU/PU boundaries in a uniform fashion, OBMC is performed at sub-block level for all MC block boundaries, where sub-block size is set equal to 4×4, as illustrated in FIG. 9.

In JEM, when OBMC applies to the current sub-block (e.g., blocks shaded with right-to-left hashing in the examples of FIG. 9), besides current motion vectors, motion vectors of four connected neighbouring sub-blocks, if available and not identical to the current motion vector, are also used to derive prediction block for the current sub-block. These multiple prediction blocks, which are based on multiple motion vectors, are weighted to generate the final prediction signal of the current sub-block.

Denote a prediction block based on motion vectors of a neighboring sub-block as $P_N$, with N indicating an index for the above-, below-, left-, and right-neighboring sub-blocks, and denote the prediction block based on motion vectors of the current sub-block as $P_C$. When $P_N$ belongs to the same PU as $P_C$ (and thus, contains the same motion information), OBMC is not performed from $P_N$. Otherwise, every pixel of $P_N$ is added to the same pixel in $P_C$, i.e., four rows/columns of $P_N$ are added to $P_C$. Example weighting factors of $\{1/4, 1/8, 1/16, 1/32\}$ may be used for $P_N$, and corresponding weighting factors $\{3/4, 7/8, 15/16, 31/32\}$ may be used for $P_C$.

Exceptions may include small MC blocks, (i.e., when PU size is equal to 8×4, 4×8, or a PU is coded with ATMVP mode), for which only two rows/columns of $P_N$ are added to $P_C$. In this case, weighting factors $\{1/4, 1/8\}$ may be used for $P_N$ and weighting factors $\{3/4, 7/8\}$ may be used for $P_C$. When $P_N$ is generated based on motion vectors of a vertically (or horizontally) neighboring sub-block, pixels in the same row (column) of $P_N$ may be added to $P_C$ with a same weighting factor. For PU boundaries, OBMC can be applied on each side of the boundary. In the example of FIG. 9, OBMC can be applied along the boundary between PU1 and PU2 twice. First, OBMC may be applied with the MV of PU2 to the shaded blocks along the boundary inside PU1. Second, OBMC may be applied with the MV of PU1 to the shaded blocks along the boundary inside PU2. In other examples, OBMC can be applied to one side of CU boundaries, because when coding (encoding or decoding) the current CU, a video coder cannot change CUs that have been coded.

Figure 10:
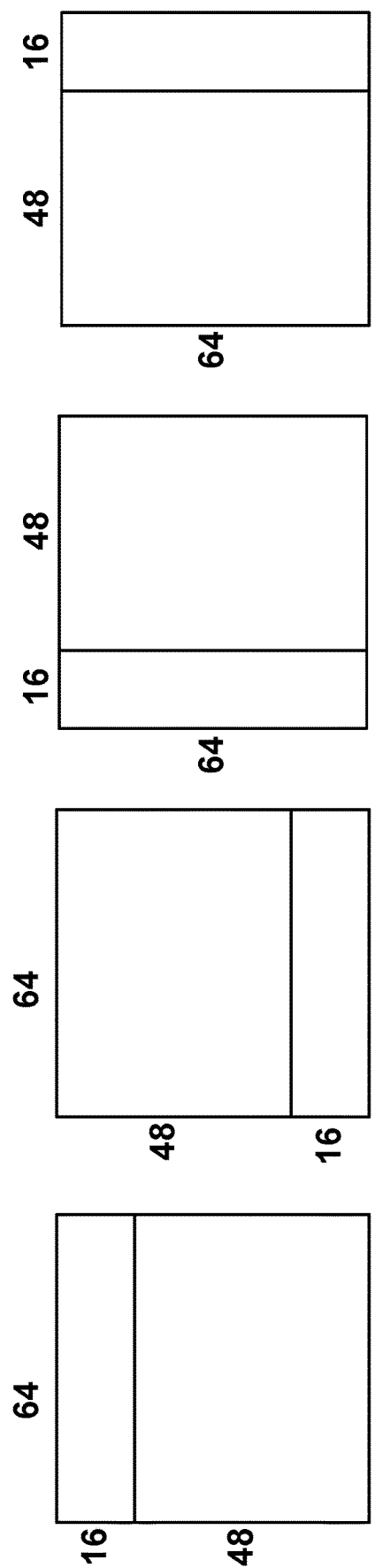
FIG. 10 is a conceptual diagram illustrating examples of asymmetric motion partitions for a 64×64 block.

FIG. 10 is a conceptual diagram illustrating examples of asymmetric motion partitions for various 64×64 blocks. An overlapped transform is a transform performed on a block crossing a PU boundary. In general, transform blocks are aligned with prediction blocks, since the prediction boundary usually presents discontinuity. Therefore, transform blocks crossing prediction block boundaries can create high-frequency coefficients that may be detrimental to coding performance. However, for inter coded blocks, which usually present few prediction residuals, a transform block larger than a prediction block sometimes can be helpful to better compact the energy and avoid unnecessary signaling of various transform block sizes.

In HEVC, a transform coding structure using the residual quadtree (RQT) is applied, which is briefly described as discussed in "Transform Coding Using the Residual Quadtree (RQT)," available at www.hhi.fraunhofer.de/fields-of-competence/image-processing/research-groups/image-video-coding/hevc-high-efficiency-video-coding/transform-coding-using-the-residual-quadtree-rqt.html. Starting from the CTU, which is typically a 64×64 image block in the default configuration of HEVC, the image block can be further split into smaller square coding units (CUs). After the CTU is split recursively into CUs, each CU is further divided into prediction units (PU) and transform units (TU).

In HEVC, the partitioning of a CU into PUs is selected from several pre-defined candidates. Assuming the CU to be size 2N×2N, for an intra CU, if the CU size is 8×8, the CU can be partitioned into one 2N×2N PU or four N×N PUs, if the CU size is larger than 8×8, the PU is always equal to the size of CU, i.e., 2N×2N. For an Inter CU, the prediction size can be 2N×2N, N×2N, 2N×N, or asymmetric motion partitions (AMP) including 2N×nU, 2N×nD, nL×2N, and nR×2N. An example of asymmetric motion partitions for 64×64 block according to HEVC is shown in FIG. 10.

Figure 11:
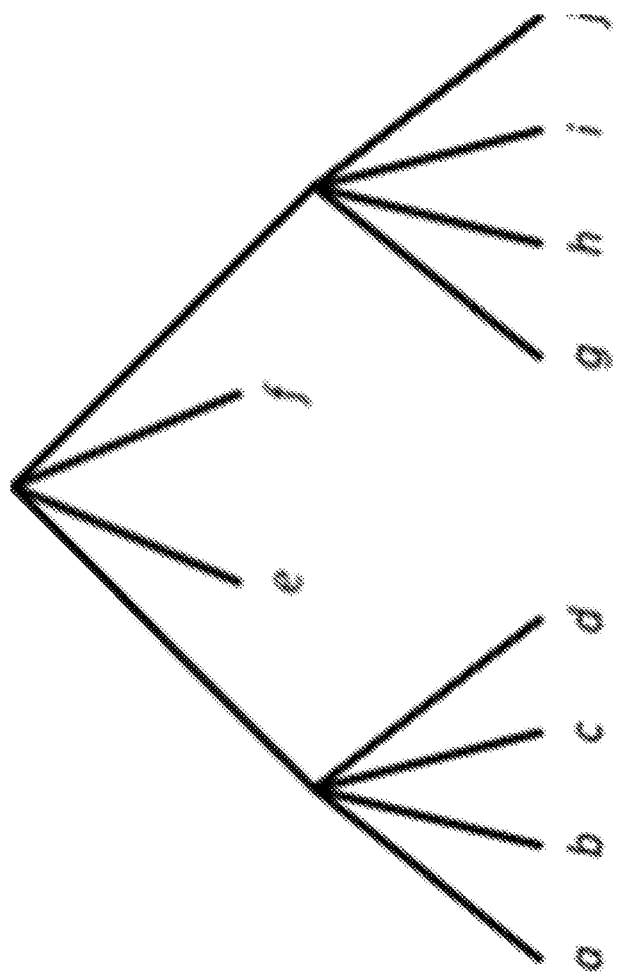
FIG. 11 is a conceptual diagram illustrating an example transform scheme based on a residual quadtree according to HEVC.
Figure 11:
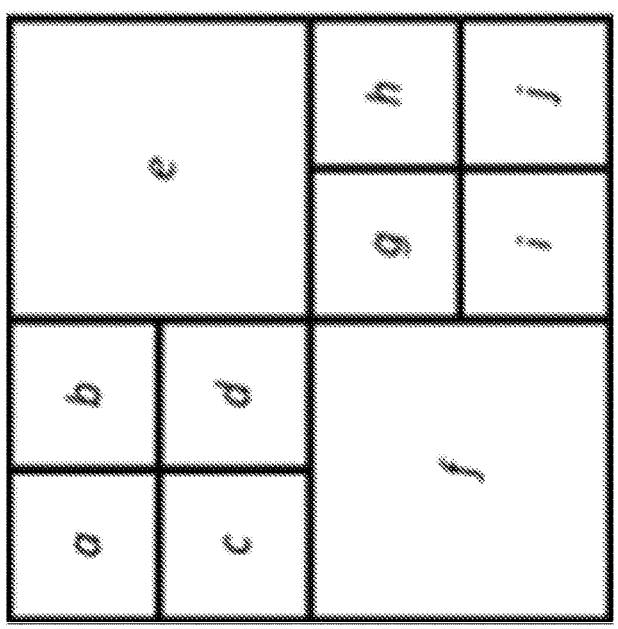

FIG. 11 is a conceptual diagram illustrating an example transform scheme based on a residual quadtree according to HEVC. The partitioning of a CU into TUs is carried out recursively based on a quadtree approach. Therefore, the residual signal of each CU is coded by a tree structure, namely, the residual quadtree (RQT). The RQT allows TU sizes from 4×4 up to 32×32 luma samples. FIG. 11 shows an example where a CU includes 10 TUs, labeled with the letters a to j, and the corresponding block partitioning. Each node of the RQT is actually a transform unit (TU).

The individual TUs are processed in depth-first tree traversal order, which is illustrated in the figure as alphabetical order, which follows a recursive Z-scan with depth-first traversal. The quadtree approach enables the adaptation of the transform to the varying space-frequency characteristics of the residual signal. Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by the encoder mode decision, for example, based on a rate-distortion optimization technique. The encoder performs the rate-distortion optimization technique to calculate a weighted sum of coding bits and reconstruction distortion, i.e., the rate-distortion cost, for each coding mode (e.g., a specific RQT splitting structure), and selects the coding mode with least rate-distortion cost as the best mode.

For an inter coded CU, when a transform block cross the boundary of a prediction block or motion block, high frequency coefficients are generated, which may impose negative influence on coding performance. For the case of asymmetric motion partitioning (AMP), this problem may be more serious, because transform block at first and second level will cross a corresponding motion block boundary. However, for inter coded CUs, a transform unit larger than a corresponding PU, e.g., 2N×2N transform unit can be still useful, which is based on the consideration that a 2N×2N transform can get a better result when the residual inside a coding unit is small, and using 2N×2N TU can also save signaling bits that could help to improve coding efficiency.

In HEVC, for an Intra coded CU, the TU cannot across the prediction boundary, i.e., PU boundary. However, for an Inter coded CU, the TU can be as large as the CU size, which means the transform can be performed across the prediction boundary.

In HEVC, QP values are allowed to be changed at CU level. A quantization group is defined as a region where a single base QP value is used to code difference of QP values for all CUs within the region. However, a similar concept may be difficult to define in existing multi-type tree structures, as the logical group of leaf nodes may represent very diverse shapes, and hence, it can be challenging to find a good, common predictor for QP-delta coding.

For example, at object boundaries which may be partitioned using rectangular shapes, a lower QP value can be used for foreground partitions and a higher QP value may be required for background partitions. It is desirable to use different QP values for different partitions to further improve the perceptual quality of the encoded video.

Figure 12:
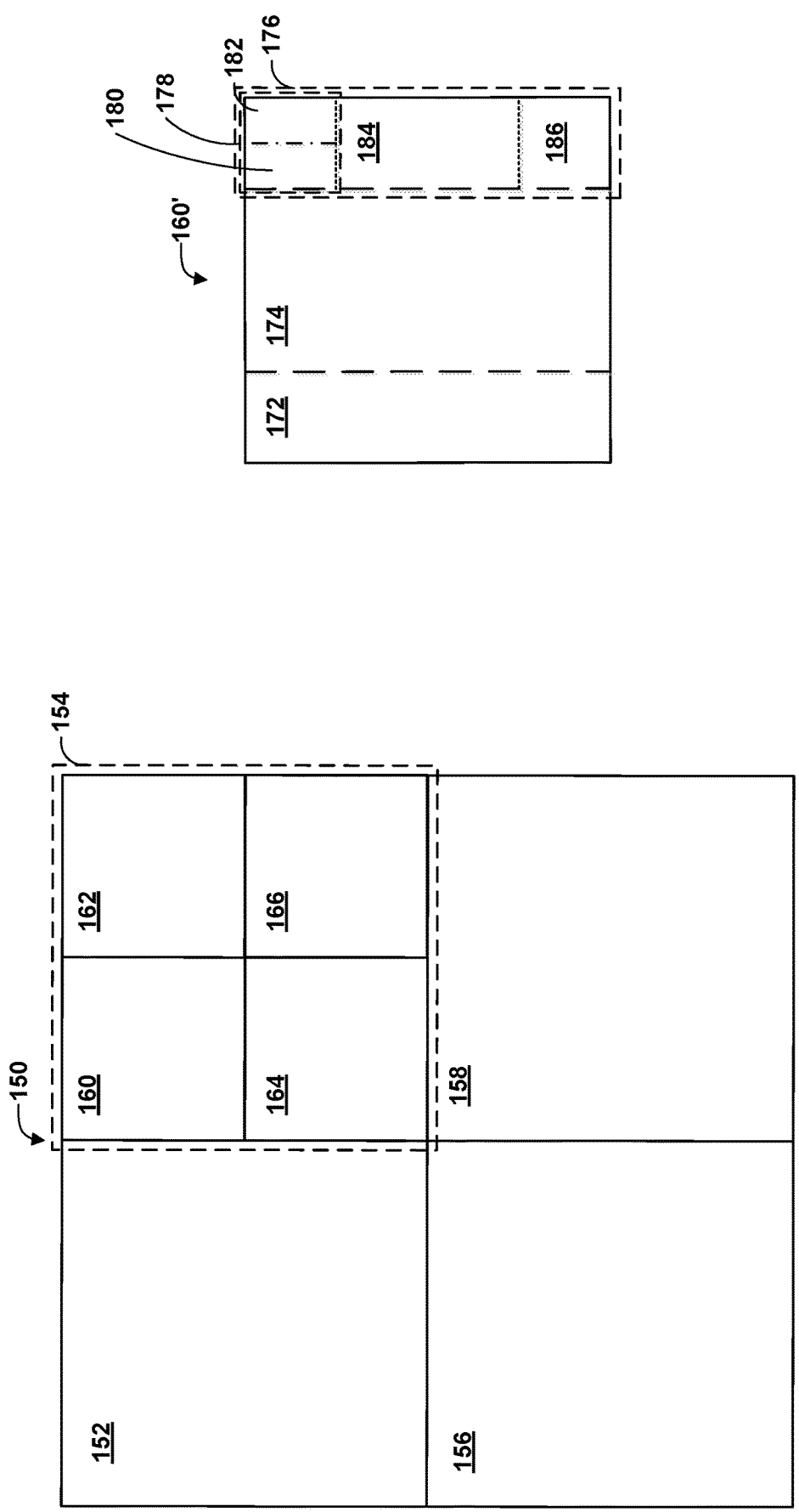
FIG. 12 is a conceptual diagram illustrating an example of a first level of a multi-type-tree and a second level of the multi-type-tree.

FIG. 12 is a conceptual diagram illustrating an example of a first level 150 of a multi-type-tree and a second level 160' of the multi-type-tree. First level 150 may also be referred to as a region tree, and second level 160' may be referred to as a prediction tree. Second level 160' corresponds to block 160 of first level 150. In particular, first level 150 is partitioned with a quadtree, and second level 160' corresponds to a region tree leaf that is further split into smaller blocks with a binary tree and center-side-triple tree. In this example, a CTB is partitioned into four quadtree leaves 152, 154, 156, and 158, the second of which (block 154) is partitioned into four further quadtree leaves 160, 162, 164, and 166, resulting in first level 150 (having seven total region tree leaf nodes). In the example of FIG. 12, block 160 represents a region tree leaf node and is partitioned (according to second level 160') into a first set of center-side triples 172, 174, 176, the right of which (176) is also partitioned into center-side triple blocks 178, 184, 186, the first of which (block 178) is partitioned using a binary tree (that is, into binary tree leaves corresponding to blocks 180, 182). Thus, second level 160' includes six total leaf nodes. These six leaf nodes may correspond to coding units (CUs), in accordance with the techniques of this disclosure. Video encoder 20 may encode, and video decoder 30 may decode, video data (e.g., prediction and transform data) for each of the CUs (e.g., each of blocks 172, 174, 180, 182, 184, and 186).

In one example, video encoder 20 and video decoder 30 may be configured to partition CTBs using a multi-type-tree having a region tree, leaf nodes of which are partitioned using a binary tree and/or a center-side-triple tree. FIG. 12 illustrates an example, where quad-tree based region tree is on the left (resulting in first level 150) and binary/triple tree based prediction tree is on the right (resulting in second level 160'). Long dashed lines show the first-depth split of a region tree leaf of second level 160', with horizontal center-side triple tree, short dashed lines represent the second-depth split with vertical center-side triple tree, and a dot-dashed line for the third-depth split with horizontal binary tree.

In one example, video encoder 20 and video decoder 30 may signal/determine whether OBMC is on at the level of a region tree leaf. In the example of FIG. 12, second level 160' represents a region tree leaf, and inner blocks 172, 174, 176, 178, 180, 182, 184, and 186 of second level 160' indicate partitioning by the prediction tree. The inner lines represent CU boundaries for CUs of prediction tree leaves, i.e., blocks 172, 174, 180, 182, 184, and 186. When OBMC is enabled for this region tree leaf (that is, second level 160'), the inner lines (that is, the long dashed, short dashed, and dot-dashed lines) can be regarded the same as PU boundaries of HEVC, so that PU-boundary OBMC can be applied to both sides of the boundaries between blocks 172, 174, 180, 182, 184, and 186. In this case, the OBMC process may be regarded as an additional refinement or filtering after encoding/decoding the whole region tree leaf.

In one example, video encoder 20 and video decoder 30 may apply an overlapped transform at the level or region tree leaf level. As shown in second level 160' of FIG. 12, a region tree leaf contains several CUs (i.e., blocks 172, 174, 180, 182, 184, and 186). When video encoder 20 or video decoder 30 enables overlapped transforms for the region tree leaf, video encoder 20 and/or video decoder 30 may apply a large transform with the same size as the region tree leaf to second level 160' (i.e., the entire region tree leaf). Video encoder 20 or video decoder 30 may apply the transform tree to the region tree leaf.

In one example, video encoder 20 and/or video decoder 30 may apply a super skip/merge mode at the level of region tree leaf. When such a super skip/merge mode is enabled, video encoder 20 or video decoder 30 codes (i.e., encodes or decodes) all of the CUs within the region tree leaf, such as blocks 172, 174, 180, 182, 184, and 186 shown in second level 160' of FIG. 12, using skip/merge mode, so that video encoder 20 does not encode and video decoder 30 does not decode skip/merge flags independently for each CU (i.e., each of blocks 172, 174, 180, 182, 184, and 186).

In one example, video encoder 20 and video decoder 30 apply a base QP at the level of the region tree leaf. When QP delta coding is enabled, video encoder 20 and video decoder 30 may use the same base QP to code delta QP values for all CUs/blocks within the region tree leaf (i.e., each of blocks 172, 174, 180, 182, 184, and 186).

Figure 13:
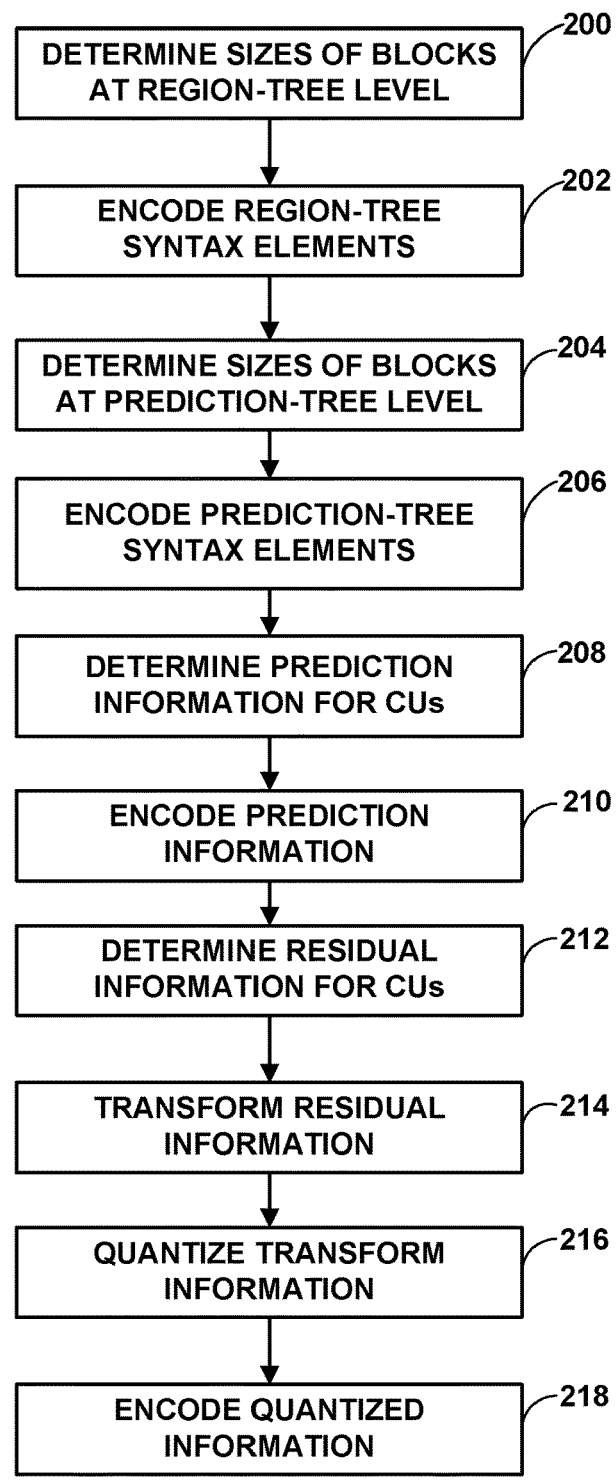
FIG. 13 is a flowchart illustrating an example method for encoding a coding tree block in accordance with techniques of this disclosure.

FIG. 13 is a flowchart illustrating an example method for encoding a coding tree block in accordance with techniques of this disclosure. For purposes of example and explanation, the method of FIG. 13 is explained with respect to video encoder 20. However, in other examples, other units may be configured to perform the techniques of FIG. 13.

In this example, initially, mode select unit 40 determines sizes of blocks at a region-tree level for a coding tree block (CTB) (200). For example, mode select unit 40 may execute a variety of different encoding passes and determine sizes of the blocks at the region-tree level based on a rate-distortion analysis. Mode select unit 40 may then send region-tree syntax elements to entropy encoding unit 56 to be encoded (202), such as split flags indicating how blocks corresponding to region-tree nodes are partitioned. The split flags may further indicate when a region tree branch terminates at a region tree leaf node, which acts as the root node for a partition-tree. In accordance with the techniques of this disclosure, each non-leaf node of the region-tree is split into a number of child nodes that is at least four child nodes, such as four, five, six, etc. child nodes.

Additionally, mode select unit 40 may determine whether to enable various coding tools for the CTB, and send syntax elements to entropy encoding unit 56 to be encoded, where the syntax elements represent enabled coding tools. These syntax elements may be included in region-tree level information, such as region-tree leaf nodes. The syntax elements may include, for example, overlapped block motion compensation (OBMC) as discussed above, overlapped transforms, super skip mode, super merge mode, super intra-prediction mode, super inter-prediction mode, and/or super frame-rate upconversion (FRUC) mode. In some examples, mode select unit 40 enables super modes (such as super skip mode, super merge mode, super intra-prediction mode, super inter-prediction mode, and/or super FRUC mode) when a number of CUs included in a region-tree leaf node is larger than a threshold. The threshold may be predefined, or entropy encoding unit 56 may encode syntax elements that define the threshold, e.g., in an SPS, a PPS, a slice header, or the like.

Mode select unit 40 may then determine sizes of blocks at a prediction-tree level for each of the region-tree leaf nodes (204). Again, each of the region-tree leaf nodes may also act as a root node of a respective prediction-tree. It should be understood that not all branches of the region-tree are necessarily the same size, and therefore, prediction-trees of a CTB may start at various region-tree depths. Mode select unit 40 may again test various encoding passes and use a rate-distortion analysis to determine sizes for blocks corresponding to the prediction-tree level (namely, by selecting block sizes that yield the best tested rate-distortion characteristics). Mode select unit 40 may then provide syntax elements to entropy encoding unit 56 to be entropy encoded (206), such as split flags for the prediction-trees. In accordance with the techniques of this disclosure, each non-leaf node of the prediction-tree may be split into a number of child nodes that is at least two child nodes, such as two, three, four, etc. child nodes. Moreover, in some examples, video encoder 20 may split prediction-tree nodes into either two child prediction-tree nodes or three child prediction-tree nodes using a center-side triple partitioning.

In some examples, video encoder 20 may encode certain syntax elements at either or both of the region-tree level and the prediction-tree level. For example, video encoder 20 may encode filtering tool parameters, such as sample adaptive offset (SAO) and/or adaptive loop filter (ALF) parameters, at either or both of the region-tree level and the prediction-tree level. Furthermore, video encoder 20 may encode these syntax elements at any node of the region-tree and/or the prediction-tree, not necessarily at only leaf nodes.

In accordance with the techniques of this disclosure, prediction-tree leaf nodes correspond to coding units (CUs) having prediction and transform data. Thus, after partitioning the prediction-tree nodes into prediction-tree leaf nodes, video encoder 20 may encode prediction and transform data for each of the CUs (i.e., the prediction-tree leaf nodes). In particular, mode select unit 40 may determine whether to predict the CUs using intra-prediction, inter-prediction, or skip mode, (208) and then send syntax information to entropy encoding unit 56 to entropy encode the prediction information (210) (e.g., an intra-mode, motion information such as merge mode or AMVP mode information, or the like).

Mode select unit 40 also provides a predicted block of a CU to summer 50, which calculates a residual block for the corresponding CU. In this manner, video encoder 20 determines residual information for the corresponding CU (212). Transform processing unit 52 applies a transform to the residual block to transform the residual data (214), and then quantization unit 54 quantizes the transformed residual information (216) (i.e., transform coefficients) to produce quantized transform coefficients (also referred to as quantized transform information). Entropy encoding unit 56 then entropy encodes the quantized transform information (218). Entropy encoding unit 56 may further entropy encode other syntax elements, such as quantization parameter (QP) information. In accordance with the techniques of this disclosure, in some examples, each QP for each of the CUs of a CTB may be predicted from a base QP for the entire CTB.

In this manner, the method of FIG. 13 represents an example of a method of encoding video data, the method including determining how region-tree nodes at a region-tree level of a region-tree of a tree data structure for a coding tree block (CTB) of video data are to be split into child region-tree nodes, the region-tree having one or more region-tree nodes including zero or more region-tree non-leaf nodes and one or more region-tree leaf nodes, each of the region-tree non-leaf nodes having a first number of child region-tree nodes, the first number being at least four, encoding one or more syntax elements at the region-tree level representing at least how the region-trees are split into the region-tree nodes, determining how prediction-tree nodes at a prediction-tree level for each of the region-tree leaf nodes of one or more prediction trees of the tree data structure for the CTB are partitioned to be split into child prediction-tree nodes, the prediction trees each having one or more prediction-tree nodes including zero or more prediction-tree non-leaf nodes and one or more prediction-tree leaf nodes, each of the prediction-tree non-leaf nodes having at least two prediction-tree child nodes, each of the prediction leaf nodes defining respective coding units (CUs), encoding one or more syntax elements at the prediction-tree level representing at least how the prediction-trees are split into the prediction-tree nodes, and encoding video data, including prediction data and transform data, for each of the CUs based at least in part on the syntax elements at the region-tree level and the syntax elements at the prediction-tree level.

Figure 14:
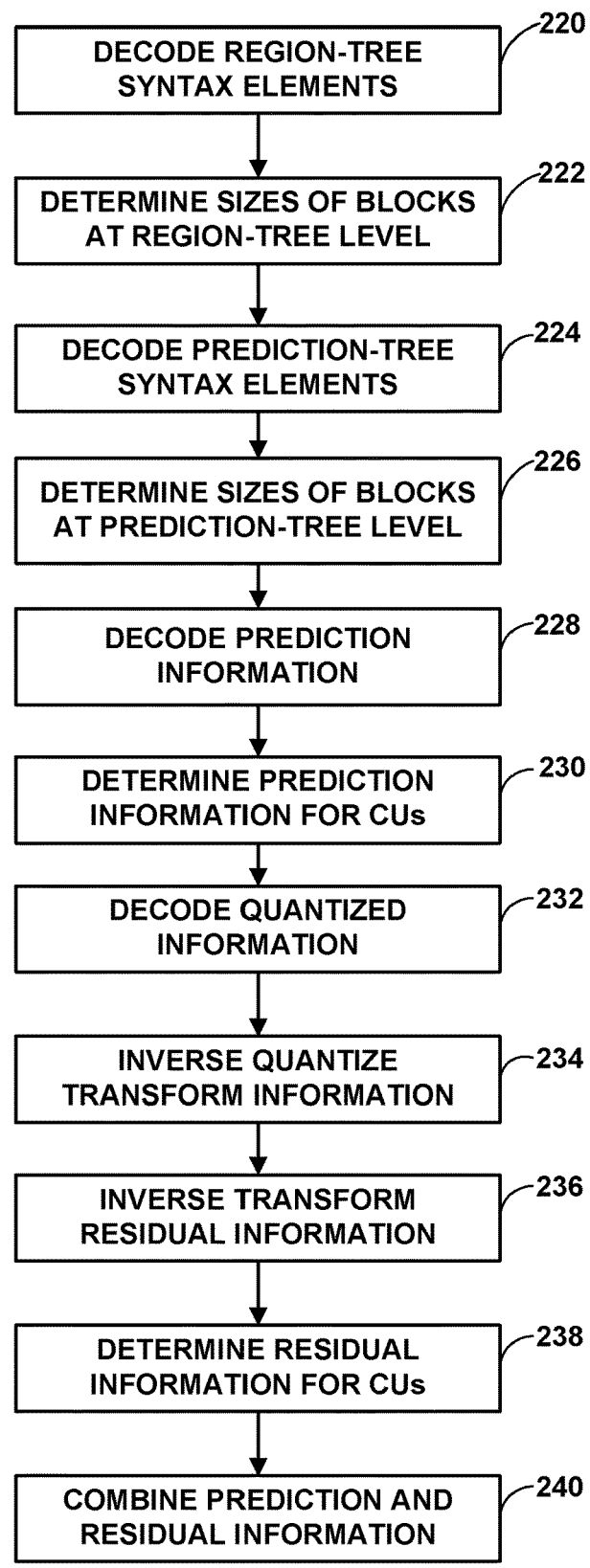
FIG. 14 is a flowchart illustrating an example method for decoding a coding tree block in accordance with techniques of this disclosure.

FIG. 14 is a flowchart illustrating an example method for decoding a coding tree block in accordance with techniques of this disclosure. For purposes of example and explanation, the method of FIG. 14 is explained with respect to video decoder 30. However, in other examples, other units may be configured to perform the techniques of FIG. 14.

In this example, initially, entropy decoding unit 70 entropy decodes region-tree-level syntax elements for a coding tree block (CTB) (220). Video decoder 30 may then determine sizes of blocks at a region-tree level from the syntax elements at the region-tree level (222). For example, the syntax elements may include split flags indicating how blocks corresponding to region-tree nodes are partitioned. The split flags may further indicate when a region tree branch terminates at a region tree leaf node, which acts as the root node for a partition-tree. In accordance with the techniques of this disclosure, each non-leaf node of the region-tree is split into a number of child nodes that is at least four child nodes, such as four, five, six, etc. child nodes.

Additionally, entropy decoding unit 70 may decode syntax elements representing whether various coding tools for the CTB are enabled. These syntax elements may be included in region-tree level information. The syntax elements may represent, for example, overlapped block motion compensation (OBMC), overlapped transforms, super skip mode, super merge mode, super intra-prediction mode, super inter-prediction mode, and/or super frame-rate upconversion (FRUC) mode, as discussed above. In some examples, video decoder 30 may enable super modes (such as super skip mode, super merge mode, super intra-prediction mode, super inter-prediction mode, and/or super FRUC mode) only when a number of CUs included in a region-tree leaf node is larger than a threshold. The threshold may be predefined, or entropy decoding unit 70 may decode syntax elements that define the threshold, e.g., in an SPS, a PPS, a slice header, or the like.

Entropy decoding unit 70 may then decode prediction-tree syntax elements for prediction trees corresponding to region-tree leaf nodes (224). Video decoder 30 may then determine sizes of blocks at the prediction-tree level for each of the region-tree leaf nodes (226) based on the prediction-tree-level syntax elements. Again, each of the region-tree leaf nodes may also act as a root node of a respective prediction-tree. For example, the syntax elements may include split flags for the prediction-trees. In accordance with the techniques of this disclosure, each non-leaf node of the prediction-tree may be split into a number of child nodes that is at least two child nodes, such as two, three, four, etc. child nodes. Moreover, in some examples, video decoder 30 may split prediction-tree nodes into either two child prediction-tree nodes or three child prediction-tree nodes using a center-side triple partitioning, based on the syntax elements signaled in the prediction-tree nodes.

In some examples, video decoder 30 may decode certain syntax elements at either or both of the region-tree level and the prediction-tree level. For example, video decoder 30 may decode filtering tool parameters, such as sample adaptive offset (SAO) and/or adaptive loop filter (ALF) parameters, at either or both of the region-tree level and the prediction-tree level. Furthermore, video decoder 30 may decode these syntax elements at any node of the region-tree and/or the prediction-tree, not necessarily at only leaf nodes.

In accordance with the techniques of this disclosure, prediction-tree leaf nodes correspond to coding units (CUs) having prediction and transform data. Thus, after partitioning the prediction-tree nodes into prediction-tree leaf nodes, video decoder 30 may decode prediction and transform data for each of the CUs (i.e., the prediction-tree leaf nodes). In particular, entropy decoding unit 70 may decode syntax information representing prediction information (228), such as syntax information indicating whether to predict the CUs using intra-prediction, inter-prediction, or skip mode. Video decoder 30 may then determine a prediction mode for each CU (230), e.g., whether each CU is predicted using an intra-mode, an inter-mode (as well as motion information such as merge mode or AMVP mode information), or the like. Motion compensation unit 72 or intra prediction unit 74 uses the prediction information to form predicted blocks for each of the CUs.

Entropy decoding unit 70 also entropy decodes quantized transform information (232). Inverse quantization unit 76 inverse quantizes the quantized transform information (234) to reproduce transform coefficients (also referred to as transform information). Inverse transform unit 78 inverse transforms the transform information (236) to reproduce residual blocks for the CUs (238). Summer 80 combines the residual blocks and predicted blocks for each of the respective CUs (240) to reproduce the CUs, and stores the CUs in reference picture memory 82 for subsequent use as reference and for output as decoded video data.

In this manner, the method of FIG. 14 represents an example of a method of decoding video data including decoding one or more syntax elements at a region-tree level of a region-tree of a tree data structure for a coding tree block (CTB) of video data, the region-tree having one or more region-tree nodes including zero or more region-tree non-leaf nodes and one or more region-tree leaf nodes, each of the region-tree non-leaf nodes having a first number of child region-tree nodes, the first number being at least four, determining, using the syntax elements at the region-tree level, how the region-tree nodes are split into the child region-tree nodes, decoding one or more syntax elements at a prediction-tree level for each of the region-tree leaf nodes of one or more prediction trees of the tree data structure for the CTB, the prediction trees each having one or more prediction-tree nodes including zero or more prediction-tree non-leaf nodes and one or more prediction-tree leaf nodes, each of the prediction-tree non-leaf nodes having a second number of child prediction-tree nodes, the second number being at least two, each of the prediction leaf nodes defining respective coding units (CUs), determining, using the syntax elements at the prediction-tree level, how the prediction-tree nodes are split into the child prediction-tree nodes, and decoding video data, including prediction data and transform data, for each of the CUs based at least in part on the syntax elements at the region-tree level and the syntax elements at the prediction-tree level.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

decoding a region-tree at a region-tree level of a tree data structure for a coding tree block (CTB) of video data, the region-tree having four region-tree nodes, each of the region-tree nodes including either 1) four additional region-tree nodes, or 2) two or three prediction-tree nodes of respective prediction-trees at a prediction-tree level of the tree data structure, wherein decoding the region-tree comprises decoding syntax elements of the region-tree;

determining, using the syntax elements of the region-tree at the region-tree level, whether the region-tree nodes include 1) the four additional region-tree nodes or 2) the two or three prediction-tree nodes;

decoding the prediction-trees of the tree data structure for the CTB, each of the prediction-tree nodes of the prediction-trees including either 1) a first set of child nodes consisting of two additional prediction-tree nodes, 2) a second set of child nodes consisting of three additional prediction-tree nodes, or 3) a coding unit (CU), wherein decoding the prediction-tree nodes comprises decoding syntax elements of the prediction-trees, and wherein at least one of the prediction-tree nodes includes the second set of child nodes consisting of three additional prediction-tree nodes without including additional prediction-tree nodes beyond the three additional prediction-tree nodes;

determining, using the syntax elements of the prediction-trees at the prediction-tree level, whether the prediction-tree nodes include 1) the additional prediction-tree nodes, or 2) the CUs; and decoding video data of the CUs, the video data of each of the CUs including prediction data and transform data, wherein the prediction data indicates a prediction mode for forming a predicted block for a corresponding one of the CUs that is the size of the corresponding one of the CUs, and wherein the transform data includes transform coefficients representing transformed residual data for the corresponding one of the CUs, the transform coefficients being arranged in a transform block that is the size of the corresponding one of the CUs.

2. The method of claim 1, wherein decoding the syntax elements of the region-tree and decoding the syntax elements of the prediction-trees comprises decoding one or more no-further-split tree types for at least one of the region-tree or the prediction-trees.

3. The method of claim 1, further comprising decoding data representing a maximum region-tree depth for the region-tree level.

4. The method of claim 3, further comprising decoding data representing a maximum prediction-tree depth for the prediction-tree level.

5. The method of claim 4, wherein a sum of the maximum region-tree depth and the maximum prediction-tree depth is less than a maximum total depth value.

6. The method of claim 4, wherein decoding the data representing the maximum prediction-tree depth comprises decoding the data representing the maximum prediction-tree depth in one or more of a sequence parameter set (SPS), a picture parameter set (PPS), or a slice header.

7. The method of claim 3, wherein decoding the data representing the maximum region-tree depth comprises decoding the data representing the maximum region-tree depth from one or more of a sequence parameter set (SPS), a picture parameter set (PPS), or a slice header.

8. The method of claim 1, further comprising decoding one syntax element that jointly represents both a maximum region-tree depth for the region-tree level and a maximum prediction-tree depth for the prediction-tree level.

9. The method of claim 8, wherein decoding the one syntax element that jointly represents the maximum region-tree depth and the maximum prediction-tree depth comprises decoding the one syntax element from one or more of a sequence parameter set (SPS), a picture parameter set (PPS), or a slice header.

10. The method of claim 1, further comprising inferring that at least one node, comprising at least one of the region-tree nodes or at least one of the prediction-tree nodes, is split without decoding split data for the node.

11. The method of claim 10, wherein inferring comprises inferring that the at least one node is split based on a block to which the node corresponds crossing at least one of picture boundary, a slice boundary, or a tile boundary.

12. The method of claim 1, further comprising decoding data indicating whether the region-tree depth and the prediction-tree depth overlap with each other.

13. The method of claim 1, wherein the video data for each of the CUs comprises one or more of a skip flag, a merge index, a syntax element representing whether the CU is predicted using inter-mode or intra-mode, intra-mode prediction information, motion information, transform information, residual information, or quantization information.

14. The method of claim 1, wherein decoding the one or more syntax elements at the region-tree level comprises decoding one or more syntax elements representing splitting information for the prediction trees before decoding the video data for each of the CUs.

15. The method of claim 14, further comprising determining the number of CUs using the splitting information before decoding the video data for each of the CUs.

16. The method of claim 1, wherein decoding the syntax elements at the region-tree level comprises decoding one or more syntax elements representing one or more enabled coding tools at the region-tree level.

17. The method of claim 16, further comprising applying the coding tools across boundaries of the CUs when the boundaries of the CUs are within a common region as indicated by one of the region-tree nodes of the region-tree.

18. The method of claim 16, further comprising decoding data representing one or more of the enabled coding tools in the region-tree nodes.

19. The method of claim 18, wherein decoding the data representing one or more of the enabled coding tools comprises decoding overlapped block motion compensation (OBMC) mode information one or more of the region-tree nodes representing whether OBMC is enabled for blocks of the video data corresponding to the one or more of the region-tree nodes.

20. The method of claim 18, wherein decoding the data representing one or more of the enabled coding tools comprises decoding overlapped transforms information in one or more of the region-tree nodes representing whether overlapped transforms are enabled for blocks of the video data corresponding to the one or more of the region-tree nodes, wherein overlapped transforms comprises a coding tool for which a transform block is permitted to overlap a boundary between two prediction blocks of a region corresponding to the one or more of the region-tree nodes.

21. The method of claim 18, wherein decoding the data representing one or more of the enabled coding tools comprises decoding data in one or more of the region-tree nodes indicating whether all of the CUs within a region corresponding to the one or more of the region-tree node are coded using one of skip mode, merge mode, intra-mode, inter-mode, or frame-rate upconversion (FRUC) mode, and wherein when all of the CUs within one of the regions are coded using a common mode, the method further comprises preventing decoding of mode information for the CUs at the CU level.

22. The method of claim 1, wherein decoding the syntax elements at the region-tree level comprises decoding at least one of sample adaptive offset (SAO) parameters or adaptive loop filter (ALF) parameters.

23. The method of claim 1, further comprising decoding one or more center-side triple tree syntax elements in the prediction-tree level.

24. The method of claim 1, further comprising calculating respective quantization parameters (QPs) for each of the CUs, wherein calculating the respective QPs comprises determining base QPs for one or more of the region-tree nodes and calculating the respective QPs based on the base QPs of the one or more of the corresponding region-tree nodes of the CUs.

25. The method of claim 1, further comprising encoding the video data prior to decoding the video data.

26. A device for decoding video data, the device comprising:
a memory configured to store video data; and
a processor implemented in circuitry and configured to:
decode a region-tree at a region-tree level of a tree data structure for a coding tree block (CTB) of video data, the region-tree having four region-tree nodes, each of the region-tree nodes including either 1) four additional region-tree nodes, or 2) two or three prediction-tree nodes of respective prediction-trees at a prediction-tree level of the tree data structure, wherein the processor is configured to decode syntax elements of the region-tree;

determine, using the syntax elements of the region-tree at the region-tree level, whether the region-tree nodes include 1) the four additional region-tree nodes or 2) the two or three prediction-tree nodes;

decode the prediction-trees of the tree data structure for the CTB, each of the prediction-tree nodes of the prediction-trees including either 1) a first set of child nodes consisting of two additional prediction-tree nodes, 2) a second set of child nodes consisting of three additional prediction-tree nodes, or 3) a coding unit (CU), wherein decoding the prediction-tree nodes comprises decoding syntax elements of the prediction-trees, and wherein at least one of the prediction-tree nodes includes the second set of child nodes consisting of three additional prediction-tree nodes without including additional prediction-tree nodes beyond the three additional prediction-tree nodes;

determine, using the syntax elements of the prediction-trees at the prediction-tree level, whether the prediction-tree nodes include 1) the additional prediction-tree nodes, or 2) the CUs; and decode video data of the CUs, the video data of each of the CUs including prediction data and transform data, wherein the prediction data indicates a prediction mode for forming a predicted block for a corresponding one of the CUs that is the size of the corresponding one of the CUs, and wherein the transform data includes transform coefficients representing transformed residual data for the corresponding one of the CUs, the transform coefficients being arranged in a transform block that is the size of the corresponding one of the CUs.

27. The device of claim 26, further comprising at least one of:
a display configured to display the decoded video data; or
a camera configured to capture the video data.

28. The device of claim 26, wherein the device comprises one or more of a camera, a computer, a mobile device, a broadcast receiver device, or a set-top box.

29. A device for decoding video data, the device comprising:
means for decoding a region-tree at a region-tree level of a tree data structure for a coding tree block (CTB) of video data, the region-tree having four region-tree nodes, each of the region-tree nodes including either 1) four additional region-tree nodes, or 2) two or three prediction-tree nodes of respective prediction-trees at a prediction-tree level of the tree data structure, wherein the means for decoding the region-tree comprises means for decoding syntax elements of the region-tree;

means for determining, using the syntax elements of the region-tree at the region-tree level, whether the region-tree nodes include 1) the four additional region-tree nodes or 2) the two or three prediction-tree nodes;

means for decoding the prediction-trees of the tree data structure for the CTB, each of the prediction-tree nodes of the prediction-trees including either 1) a first set of child nodes consisting of two additional prediction-tree nodes, 2) a second set of child nodes consisting of three additional prediction-tree nodes, or 3) a coding unit (CU), wherein decoding the prediction-tree nodes comprises decoding syntax elements of the prediction-trees, and wherein at least one of the prediction-tree nodes includes the second set of child nodes consisting of three additional prediction-tree nodes without including additional prediction-tree nodes beyond the three additional prediction-tree nodes;

means for determining, using the syntax elements of the prediction-trees at the prediction-tree level, whether the prediction-tree nodes include 1) the additional prediction-tree nodes, or 2) the CUs; and means for decoding video data of the CUs, the video data of each of the CUs including prediction data and transform data, wherein the prediction data indicates a prediction mode for forming a predicted block for a corresponding one of the CUs that is the size of the corresponding one of the CUs, and wherein the transform data includes transform coefficients representing transformed residual data for the corresponding one of the CUs, the transform coefficients being arranged in a transform block that is the size of the corresponding one of the CUs.

30. A non-transitory computer-readable storage medium having stored thereon instructions that, when executed, cause a processor to:
decode a region-tree at a region-tree level of a tree data structure for a coding tree block (CTB) of video data, the region-tree having four region-tree nodes, each of the region-tree nodes including either 1) four additional region-tree nodes, or 2) two or three prediction-tree nodes of respective prediction-trees at a prediction-tree level of the tree data structure, wherein the instructions that cause the processor to decode the region-tree instructions that cause the processor to decode syntax elements of the region-tree;

determine, using the syntax elements of the region-tree at the region-tree level, whether the region-tree nodes include 1) the four additional region-tree nodes or 2) the two or three prediction-tree nodes;

decode the prediction-trees of the tree data structure for the CTB, each of the prediction-tree nodes of the prediction-trees including either 1) a first set of child nodes consisting of two additional prediction-tree nodes, 2) a second set of child nodes consisting of three additional prediction-tree nodes, or 3) a coding unit (CU), wherein decoding the prediction-tree nodes comprises decoding syntax elements of the prediction-trees, and wherein at least one of the prediction-tree nodes includes the second set of child nodes consisting of three additional prediction-tree nodes without including additional prediction-tree nodes beyond the three additional prediction-tree nodes;

determine, using the syntax elements of the prediction-trees at the prediction-tree level, whether the prediction-tree nodes include 1) the additional prediction-tree nodes, or 2) the CUs; and decode video data of the CUs, the video data of each of the CUs including prediction data and transform data, wherein the prediction data indicates a prediction mode for forming a predicted block for a corresponding one of the CUs that is the size of the corresponding one of the CUs, and wherein the transform data includes transform coefficients representing transformed residual data for the corresponding one of the CUs, the transform coefficients being arranged in a transform block that is the size of the corresponding one of the CUs.

* * * * *